United States Patent
Patton et al.

(10) Patent No.: US 8,357,214 B2
(45) Date of Patent: *Jan. 22, 2013

(54) APPARATUS, SYSTEM, AND METHOD FOR GENERATING A GAS FROM SOLID REACTANT POUCHES

(75) Inventors: John Madison Patton, Cameron Park, CA (US); Howard Anderson, Cedar Fort, UT (US)

(73) Assignee: Trulite, Inc., El Dorado Hills, CA (US)

( * ) Notice: Subject to any disclaimer, the term of this patent is extended or adjusted under 35 U.S.C. 154(b) by 664 days.

This patent is subject to a terminal disclaimer.

(21) Appl. No.: 12/480,099

(22) Filed: Jun. 8, 2009

(65) Prior Publication Data
US 2009/0304558 A1     Dec. 10, 2009

Related U.S. Application Data

(63) Continuation-in-part of application No. 11/740,349, filed on Apr. 26, 2007, now Pat. No. 7,556,660.

(60) Provisional application No. 61/059,743, filed on Jun. 6, 2008.

(51) Int. Cl.
   *B01J 8/02*     (2006.01)
   *H01M 8/06*     (2006.01)

(52) U.S. Cl. ............. 48/61; 422/625; 422/626; 422/630

(58) Field of Classification Search ............. 48/61, 120, 48/174; 422/239, 211, 234, 236, 625, 626, 422/630
   See application file for complete search history.

(56) References Cited

U.S. PATENT DOCUMENTS

| | | | |
|---|---|---|---|
| 2,542,746 A | 2/1951 | Banus et al. | 423/288 |
| 2,935,382 A | 5/1960 | Osborn et al. | |
| 3,113,832 A | 12/1963 | Kollonitsch et al. | |
| 3,133,837 A | 5/1964 | Eidensohn | 429/19 |
| 3,313,598 A | 4/1967 | Gluckstein | 23/211 |
| 3,449,078 A | 6/1969 | Quik et al. | 23/212 |
| 3,511,710 A | 5/1970 | Jung et al. | 136/86 |
| 3,649,360 A | 3/1972 | Bloomfield et al. | 136/86 |
| 3,734,863 A | 5/1973 | Beckert et al. | 252/188 |
| 3,940,474 A | 2/1976 | Huskins et al. | 423/648 |

(Continued)

FOREIGN PATENT DOCUMENTS

EP    1514839    3/2005
JP    54121292   9/1979

(Continued)

OTHER PUBLICATIONS

"Fuel Chemistry News" Newsletter of the ACS Division of Fuel Chemistry, vol. 82, No. 2, Fall 2003.

(Continued)

*Primary Examiner* — Nina Bhat
(74) *Attorney, Agent, or Firm* — Kunzler Law Group, PC

(57) ABSTRACT

An apparatus, system, and method are disclosed for generating a gas. One or more liquid permeable pouches each define a cavity that contains a solid anhydrous reactant, such as a chemical hydride. A reaction chamber made of a heat, chemical and/or pressure resistant material receives the one or more pouches from a pouch feeder that transfers the one or more pouches into the reaction chamber successively at a feed rate. One or more liquid sources inject a liquid reactant into the reaction chamber so that the liquid reactant contacts a portion of the one or more pouches. The one or more liquid sources inject the liquid reactant at an injection rate that corresponds to the feed rate. A gas outlet releases a gas, such as hydrogen, oxygen, ammonia, borazine, nitrogen, or a hydrocarbon, that is produced by a reaction between the solid reactant and the liquid reactant.

23 Claims, 4 Drawing Sheets

U.S. PATENT DOCUMENTS

| | | | |
|---|---|---|---|
| 3,977,990 A | 8/1976 | Beckert et al. | 252/188.3 |
| 3,985,865 A | 10/1976 | Hohne | |
| 4,000,003 A | 12/1976 | Baker et al. | 429/7 |
| 4,081,345 A | 3/1978 | Tolg et al. | |
| 4,124,116 A | 11/1978 | McCabe, Jr. | |
| 4,155,712 A | 5/1979 | Taschek | 422/239 |
| 4,261,955 A | 4/1981 | Bailey, Jr. et al. | 422/239 |
| 4,261,956 A | 4/1981 | Adlhart | 422/239 |
| 4,433,633 A | 2/1984 | Caudy et al. | 114/54 |
| 4,436,793 A | 3/1984 | Adlhart | 429/17 |
| 4,463,063 A | 7/1984 | Adlhart | 429/19 |
| 4,463,066 A | 7/1984 | Adlhart et al. | 429/34 |
| 4,463,068 A | 7/1984 | Cohn et al. | 429/34 |
| 4,486,276 A | 12/1984 | Cohn et al. | 204/98 |
| 4,513,065 A | 4/1985 | Adlhart | 429/19 |
| 4,543,246 A | 9/1985 | Houser | 423/648 |
| 4,628,010 A | 12/1986 | Iwanciow | 429/19 |
| 4,740,504 A | 4/1988 | Hall et al. | 514/64 |
| 4,782,096 A | 11/1988 | Banquy | 518/704 |
| 4,940,667 A | 7/1990 | Goldstein et al. | |
| 4,962,462 A | 10/1990 | Fekete | 364/492 |
| 4,968,393 A | 11/1990 | Mazur | 204/59 |
| 4,973,530 A | 11/1990 | Vanderborgh | 429/13 |
| 4,977,094 A | 12/1990 | Goldstein et al. | |
| 4,978,451 A | 12/1990 | Taylor | 210/500 |
| 4,988,583 A | 1/1991 | Watkins et al. | 429/30 |
| 4,988,593 A | 1/1991 | Takai | |
| 5,046,604 A | 9/1991 | Forhetz et al. | |
| 5,047,301 A | 9/1991 | Adlhart et al. | 429/101 |
| 5,108,849 A | 4/1992 | Watkins et al. | 429/30 |
| 5,186,903 A | 2/1993 | Cornwell | |
| 5,200,278 A | 4/1993 | Watkins et al. | 429/24 |
| 5,205,841 A | 4/1993 | Vaiman | 55/16 |
| 5,221,520 A | 6/1993 | Cornwell | |
| 5,229,222 A | 7/1993 | Tsutsumi et al. | 429/19 |
| 5,264,299 A | 11/1993 | Krasij et al. | 429/30 |
| 5,292,600 A | 3/1994 | Kaufman | 429/39 |
| 5,294,410 A | 3/1994 | White | |
| 5,314,762 A | 5/1994 | Hamada et al. | 429/37 |
| 5,366,820 A | 11/1994 | Tsutsumi et al. | 429/19 |
| 5,372,617 A | 12/1994 | Kerrebrock et al. | 48/61 |
| 5,382,478 A | 1/1995 | Chow | 429/26 |
| 5,514,353 A | 5/1996 | Adlhart | 422/239 |
| 5,534,341 A | 7/1996 | Baines et al. | |
| 5,554,343 A | 9/1996 | Wade | |
| 5,557,188 A | 9/1996 | Piercey | 320/5 |
| 5,593,640 A | 1/1997 | Long et al. | 422/111 |
| 5,599,640 A | 2/1997 | Lee et al. | 429/46 |
| 5,634,341 A | 6/1997 | Klanchar et al. | 60/673 |
| 5,667,753 A | 9/1997 | Jacobs et al. | |
| 5,674,450 A | 10/1997 | Lin et al. | |
| 5,683,828 A | 11/1997 | Spear et al. | 429/13 |
| 5,688,611 A | 11/1997 | Golben | 429/53 |
| 5,702,491 A | 12/1997 | Long et al. | 48/197 |
| 5,728,464 A | 3/1998 | Checketts | 428/403 |
| 5,747,189 A | 5/1998 | Perkins | 429/91 |
| 5,756,047 A | 5/1998 | West et al. | |
| 5,770,739 A | 6/1998 | Lin et al. | |
| 5,785,934 A | 7/1998 | Jacobs et al. | |
| 5,804,329 A | 9/1998 | Amendola | 429/34 |
| 5,833,934 A | 11/1998 | Adlhart | 422/23 |
| 5,843,297 A | 12/1998 | Schmid et al. | 205/687 |
| 5,858,587 A | 1/1999 | Yamane et al. | 430/22 |
| 5,861,137 A | 1/1999 | Edlund | |
| 5,863,671 A | 1/1999 | Spear | 429/12 |
| 5,876,666 A | 3/1999 | Lin et al. | |
| 5,932,365 A | 8/1999 | Lin et al. | 429/12 |
| 5,948,558 A | 9/1999 | Amendola | 429/50 |
| 5,955,039 A | 9/1999 | Dowdy | 422/189 |
| 5,961,923 A | 10/1999 | Nova et al. | |
| 5,962,155 A | 10/1999 | Kuranaka et al. | 429/20 |
| 5,976,725 A | 11/1999 | Gamo et al. | 429/25 |
| 5,996,976 A | 12/1999 | Murphy | 261/104 |
| 5,997,594 A | 12/1999 | Edlund et al. | |
| 5,997,812 A | 12/1999 | Burnham et al. | |
| 5,997,821 A | 12/1999 | Joshi | |
| 6,017,496 A | 1/2000 | Nova et al. | |
| 6,051,128 A | 4/2000 | Nacamuli | 208/79 |
| 6,051,331 A | 4/2000 | Spear, Jr. et al. | 429/34 |
| 6,066,409 A | 5/2000 | Ronne | 429/39 |
| 6,072,299 A | 6/2000 | Kurle et al. | 320/112 |
| 6,090,312 A | 7/2000 | Ziaka | 252/373 |
| 6,096,219 A | 8/2000 | Green et al. | |
| 6,096,286 A | 8/2000 | Autenrieth | 423/651 |
| 6,097,175 A | 8/2000 | Yoon | 320/132 |
| 6,100,026 A | 8/2000 | Nova et al. | |
| 6,106,964 A | 8/2000 | Voss et al. | |
| 6,106,965 A | 8/2000 | Hirano et al. | 429/30 |
| 6,106,968 A | 8/2000 | Johnson et al. | 429/50 |
| 6,108,968 A | 8/2000 | Peng | 47/24 |
| 6,110,429 A | 8/2000 | Johansing, Jr. | |
| 6,110,611 A | 8/2000 | Stuhler et al. | 429/13 |
| 6,156,450 A | 12/2000 | Bailey | 429/93 |
| 6,198,253 B1 | 3/2001 | Kurle et al. | 320/132 |
| 6,221,117 B1 | 4/2001 | Edlund et al. | |
| 6,231,825 B1 | 5/2001 | Colby et al. | 423/286 |
| 6,236,326 B1 | 5/2001 | Murphy | 340/636 |
| 6,238,814 B1 | 5/2001 | Horiguchi et al. | 429/12 |
| 6,248,469 B1 | 6/2001 | Formato et al. | |
| 6,250,078 B1 | 6/2001 | Amendola et al. | 60/509 |
| 6,268,077 B1 | 7/2001 | Kelley et al. | 429/33 |
| 6,274,093 B1 | 8/2001 | Long et al. | 422/129 |
| 6,284,459 B1 | 9/2001 | Nova et al. | |
| 6,289,889 B1 | 9/2001 | Bell et al. | |
| 6,309,611 B1 | 10/2001 | Tabatabaie-Raissi et al. | |
| 6,312,848 B1 | 11/2001 | Kilb et al. | 429/162 |
| 6,315,870 B1 | 11/2001 | Tabatabaie-Raissi et al. | |
| 6,334,936 B1 | 1/2002 | Tabatabaie-Raissi et al. | |
| 6,337,120 B1 | 1/2002 | Sasaki et al. | 428/66.04 |
| 6,342,128 B1 | 1/2002 | Tabatabaie-Raissi et al. | |
| 6,387,228 B1 | 5/2002 | Maget | |
| 6,387,557 B1 | 5/2002 | Krasij et al. | 429/32 |
| 6,399,234 B2 | 6/2002 | Bonk et al. | 429/32 |
| 6,428,918 B1 | 8/2002 | Fuglevand et al. | 429/13 |
| 6,433,129 B1 | 8/2002 | Amendola et al. | 528/271 |
| 6,454,871 B1 | 9/2002 | Labib et al. | |
| 6,468,682 B1 | 10/2002 | Fuglevand et al. | 429/26 |
| 6,468,694 B1 | 10/2002 | Amendola | 429/218.1 |
| 6,483,274 B2 | 11/2002 | Lee | 320/132 |
| 6,495,278 B1 | 12/2002 | Schmid et al. | 429/30 |
| 6,497,973 B1 | 12/2002 | Amendola | 429/19 |
| 6,497,974 B2 | 12/2002 | Fuglevand | 429/22 |
| 6,500,577 B2 | 12/2002 | Foster | 429/32 |
| 6,503,649 B1 | 1/2003 | Czajkowski et al. | 429/23 |
| 6,503,711 B1 | 1/2003 | Krull et al. | |
| 6,524,542 B2 | 2/2003 | Amendola et al. | 423/286 |
| 6,531,630 B2 | 3/2003 | Vidalin | 562/519 |
| 6,533,827 B1 | 3/2003 | Cisar et al. | 29/623.4 |
| 6,534,033 B1 | 3/2003 | Amendola et al. | 423/648.1 |
| 6,541,147 B1 | 4/2003 | McLean et al. | 249/35 |
| 6,544,400 B2 | 4/2003 | Hockaday et al. | 205/338 |
| 6,544,679 B1 | 4/2003 | Petillo et al. | 429/34 |
| 6,551,561 B1 | 4/2003 | Tabatabaie-Raissi et al. | |
| 6,554,400 B1 | 4/2003 | Aoki | 347/47 |
| 6,576,350 B2 | 6/2003 | Buxbaum | 428/670 |
| 6,576,361 B2 | 6/2003 | Barton | |
| 6,582,666 B2 | 6/2003 | Tabatabaie-Raissi et al. | |
| 6,586,563 B1 | 7/2003 | Ortega et al. | 528/394 |
| 6,599,653 B1 | 7/2003 | Cummins et al. | 429/35 |
| 6,602,631 B1 | 8/2003 | Cisar et al. | 429/34 |
| 6,607,857 B2 | 8/2003 | Blunk et al. | 429/34 |
| 6,610,112 B1 | 8/2003 | Klock et al. | |
| 6,645,651 B2 | 11/2003 | Hockaday et al. | 429/19 |
| 6,649,097 B2 | 11/2003 | Sasaki et al. | 264/102 |
| 6,653,003 B1 | 11/2003 | Tsai et al. | 429/17 |
| 6,670,444 B2 | 12/2003 | Amendola et al. | 528/394 |
| 6,683,025 B2 | 1/2004 | Amendola et al. | 502/439 |
| 6,685,570 B2 | 2/2004 | Zilberman et al. | 464/94 |
| 6,688,106 B2 | 2/2004 | Okusawa et al. | 60/653 |
| 6,696,204 B2 | 2/2004 | Sato et al. | |
| 6,703,722 B2 | 3/2004 | Christansen | 307/71 |
| 6,706,909 B1 | 3/2004 | Snover et al. | 558/296 |
| 6,730,269 B2 | 5/2004 | Mirkin et al. | |
| 6,733,916 B2 | 5/2004 | Mizuno | 429/36 |
| 6,743,542 B2 | 6/2004 | Krasij et al. | 429/36 |
| 6,745,801 B1 | 6/2004 | Cohen et al. | 141/231 |
| 6,746,496 B1 | 6/2004 | Kravitz et al. | 481/118.5 |

| Patent/Pub No. | Date | Inventor | Class |
|---|---|---|---|
| 6,755,219 B1 | 6/2004 | Bolle | 14/19 |
| 6,764,786 B2 | 7/2004 | Morrow et al. | 429/37 |
| 6,766,817 B2 | 7/2004 | da Silva | |
| 6,770,186 B2 | 8/2004 | Rosenfeld et al. | 205/343 |
| 6,777,127 B2 | 8/2004 | Einhart et al. | 429/35 |
| 6,783,741 B2 | 8/2004 | Edlund et al. | |
| 6,787,008 B2 | 9/2004 | Joshi et al. | 204/252 |
| 6,790,416 B2 | 9/2004 | Mann et al. | |
| 6,794,418 B2 | 9/2004 | Sogge et al. | 518/706 |
| 6,805,987 B2 | 10/2004 | Bai et al. | 429/23 |
| 6,811,764 B2 | 11/2004 | Jorgensen et al. | 423/658.2 |
| 6,811,906 B2 | 11/2004 | Bai et al. | 429/13 |
| 6,811,918 B2 | 11/2004 | Blunk et al. | 429/40 |
| 6,815,110 B2 | 11/2004 | Marsh | 429/30 |
| 6,818,334 B2 | 11/2004 | Tsang | 429/17 |
| 6,821,499 B2 | 11/2004 | Jorgensen | 423/648.1 |
| 6,827,747 B2 | 12/2004 | Lisi et al. | 29/623.1 |
| 6,846,635 B1 | 1/2005 | Anderson et al. | |
| 6,887,701 B2 | 5/2005 | Anderson et al. | |
| 6,899,967 B2 | 5/2005 | Johnson | 429/19 |
| 6,901,302 B2 | 5/2005 | Kami | 700/90 |
| 6,904,533 B2 | 6/2005 | Kuo et al. | 713/322 |
| 6,918,404 B2 | 7/2005 | Dias da Silva | |
| 6,932,847 B2 | 8/2005 | Amendola et al. | 48/76 |
| 6,939,529 B2 | 9/2005 | Strizki et al. | 423/658.2 |
| 7,004,207 B2 | 2/2006 | Finkelshtain et al. | |
| 7,019,105 B2 | 3/2006 | Amendola et al. | 528/271 |
| 7,052,671 B2 | 5/2006 | McClaine et al. | 423/658.2 |
| 7,052,793 B2 | 5/2006 | Formato et al. | |
| 7,066,586 B2 | 6/2006 | da Silva | |
| 7,074,369 B2 | 7/2006 | Tabatabaie-Raissi et al. | |
| 7,074,509 B2 | 7/2006 | Rosenfield | 429/19 |
| 7,083,657 B2 | 8/2006 | Mohring et al. | 48/61 |
| 7,097,813 B2 | 8/2006 | Ord et al. | |
| 7,105,033 B2 | 9/2006 | Strizki et al. | 48/61 |
| 7,108,777 B2 | 9/2006 | Xu et al. | 205/408 |
| 7,147,692 B2 | 12/2006 | Fornai et al. | |
| 7,166,269 B2 | 1/2007 | Tanaka et al. | |
| 7,169,489 B2 | 1/2007 | Redmond | |
| 7,179,638 B2 | 2/2007 | Anderson et al. | |
| 7,259,019 B2 | 8/2007 | Pawliszyn et al. | |
| 7,285,255 B2 | 10/2007 | Kadlec et al. | |
| 7,291,191 B2 | 11/2007 | Kaye | |
| 7,393,369 B2 | 7/2008 | Shurtleff | |
| 7,572,536 B2 | 8/2009 | Shibata et al. | |
| 2001/0000380 A1 | 4/2001 | Buxbaum | |
| 2001/0025289 A1 | 9/2001 | Jenkins et al. | 708/141 |
| 2001/0043274 A1 | 11/2001 | Shepherd et al. | 348/241 |
| 2001/0045061 A1 | 11/2001 | Edlund et al. | |
| 2001/0045364 A1 | 11/2001 | Hockaday et al. | 205/338 |
| 2001/0046616 A1 | 11/2001 | Mossmann | 429/13 |
| 2001/0050218 A1 | 12/2001 | Tabatabaie-Raissi et al. | |
| 2002/0001537 A1 | 1/2002 | Hlebovy et al. | |
| 2002/0018742 A1 | 2/2002 | Hoke et al. | |
| 2002/0022162 A1 | 2/2002 | Kagitani | 429/17 |
| 2002/0022168 A1 | 2/2002 | Faris et al. | 429/27 |
| 2002/0022170 A1 | 2/2002 | Franklin et al. | 429/34 |
| 2002/0045075 A1 | 4/2002 | Pinto et al. | 429/15 |
| 2002/0045082 A1 | 4/2002 | Marsh | 429/30 |
| 2002/0045085 A1 | 4/2002 | Formato et al. | |
| 2002/0058168 A1 | 5/2002 | Voss et al. | 429/13 |
| 2002/0076598 A1 | 6/2002 | Bostaph et al. | 429/38 |
| 2002/0083643 A1 | 7/2002 | Amendola et al. | 48/61 |
| 2002/0106313 A1 | 8/2002 | Tabatabaie-Raissi et al. | |
| 2002/0106541 A1 | 8/2002 | Yamada et al. | 429/21 |
| 2002/0106550 A1 | 8/2002 | Nishiki et al. | 429/42 |
| 2002/0136123 A1 | 9/2002 | Kelley et al. | |
| 2002/0150804 A1 | 10/2002 | Srinivasan et al. | 429/32 |
| 2002/0165417 A1 | 11/2002 | Numaguchi et al. | 585/310 |
| 2002/0166286 A1 | 11/2002 | McClaine et al. | 48/197 |
| 2002/0171021 A1 | 11/2002 | Goretti | 248/455 |
| 2002/0177015 A1 | 11/2002 | Fuglevand | 429/12 |
| 2002/0177018 A1 | 11/2002 | Fuglevand | 429/12 |
| 2002/0177042 A1 | 11/2002 | Amendola | 429/218.1 |
| 2002/0182470 A1 | 12/2002 | Agizy et al. | 429/34 |
| 2003/0003038 A1 | 1/2003 | Amendola et al. | 423/286 |
| 2003/0008187 A1 | 1/2003 | Higashiyama et al. | 429/19 |
| 2003/0008194 A1 | 1/2003 | Cargneli et al. | 429/39 |
| 2003/0009942 A1 | 1/2003 | Amendola et al. | 48/61 |
| 2003/0012999 A1 | 1/2003 | Yoshioka et al. | 429/34 |
| 2003/0037487 A1 | 2/2003 | Amendola et al. | 48/76 |
| 2003/0049857 A1 | 3/2003 | Chan | |
| 2003/0051785 A1 | 3/2003 | Gauthier et al. | |
| 2003/0085111 A1 | 5/2003 | Tabatabaie-Raissi et al. | |
| 2003/0091879 A1 | 5/2003 | Rusta-Sellehy et al. | |
| 2003/0091882 A1 | 5/2003 | Schmidt et al. | 429/23 |
| 2003/0092877 A1 | 5/2003 | Amendola et al. | 528/394 |
| 2003/0098258 A1 | 5/2003 | Gregory et al. | 208/89 |
| 2003/0111908 A1 | 6/2003 | Christensen | 307/43 |
| 2003/0113259 A1 | 6/2003 | Rusta-Sallehy et al. | 423/658.2 |
| 2003/0114632 A1 | 6/2003 | Ortega et al. | 528/196 |
| 2003/0159354 A1 | 8/2003 | Edlund et al. | |
| 2003/0162059 A1 | 8/2003 | Gelsey | 429/17 |
| 2003/0180603 A1 | 9/2003 | Richards | 429/38 |
| 2003/0194596 A1 | 10/2003 | Ye et al. | 429/38 |
| 2003/0204993 A1 | 11/2003 | Holland et al. | 48/27.9 |
| 2003/0219371 A1 | 11/2003 | Amendola | 423/351 |
| 2003/0219641 A1 | 11/2003 | Petillo | 429/38 |
| 2003/0223926 A1 | 12/2003 | Edlund et al. | |
| 2003/0226763 A1 | 12/2003 | Narayanan et al. | 205/637 |
| 2003/0228252 A1 | 12/2003 | Shurtleff | 423/657 |
| 2003/0228505 A1 | 12/2003 | Tsang | 429/19 |
| 2003/0232225 A1 | 12/2003 | Maruyama et al. | 429/22 |
| 2003/0235724 A1 | 12/2003 | Ord et al. | |
| 2003/0235749 A1 | 12/2003 | Haltiner, Jr. et al. | 429/38 |
| 2004/0005488 A1 | 1/2004 | Faris et al. | 429/23 |
| 2004/0009379 A1 | 1/2004 | Amendola et al. | 429/17 |
| 2004/0009392 A1 | 1/2004 | Petillo et al. | 429/122 |
| 2004/0011662 A1 | 1/2004 | Xu et al. | 205/404 |
| 2004/0025808 A1 | 2/2004 | Cheng | 123/3 |
| 2004/0031695 A1 | 2/2004 | Oloman et al. | 205/615 |
| 2004/0033194 A1 | 2/2004 | Amendola et al. | 423/658.2 |
| 2004/0035054 A1 | 2/2004 | Mohring et al. | 48/61 |
| 2004/0043274 A1 | 3/2004 | Scartozzi et al. | 429/34 |
| 2004/0047801 A1 | 3/2004 | Petillo et al. | 423/657 |
| 2004/0052723 A1 | 3/2004 | Jorgensen | 423/648.1 |
| 2004/0053100 A1 | 3/2004 | Stanley et al. | 429/30 |
| 2004/0062680 A1 | 4/2004 | Kampa | |
| 2004/0065865 A1 | 4/2004 | Desgardin et al. | 252/188.25 |
| 2004/0067195 A1 | 4/2004 | Strizki et al. | 423/658.2 |
| 2004/0072041 A1 | 4/2004 | Koschany | 429/23 |
| 2004/0081884 A1 | 4/2004 | Bean et al. | 429/98 |
| 2004/0109374 A1 | 6/2004 | Sundar | 365/226 |
| 2004/0115493 A1 | 6/2004 | Kim | 429/20 |
| 2004/0120889 A1 | 6/2004 | Shah et al. | 423/657 |
| 2004/0121196 A1 | 6/2004 | Liu et al. | 429/12 |
| 2004/0146769 A1 | 7/2004 | Birschbach | |
| 2004/0148857 A1 | 8/2004 | Strizki et al. | 48/127.9 |
| 2004/0160216 A1 | 8/2004 | Speranza et al. | 320/140 |
| 2004/0161646 A1 | 8/2004 | Rezachek et al. | 429/19 |
| 2004/0161652 A1 | 8/2004 | Ovshinsky et al. | 429/34 |
| 2004/0166057 A1 | 8/2004 | Schell et al. | 423/658.2 |
| 2004/0180247 A1 | 9/2004 | Higashiyama et al. | 429/19 |
| 2004/0180253 A1 | 9/2004 | Fisher | 429/34 |
| 2004/0191152 A1 | 9/2004 | Amendola et al. | 423/288 |
| 2004/0191588 A1 | 9/2004 | Eshraghi et al. | 429/19 |
| 2004/0200903 A1 | 10/2004 | Ohya et al. | 235/492 |
| 2004/0214056 A1 | 10/2004 | Gore | 429/20 |
| 2004/0214057 A1 | 10/2004 | Fuglevand et al. | 429/20 |
| 2004/0219398 A1 | 11/2004 | Calhoon | 429/13 |
| 2004/0219399 A1 | 11/2004 | Zhu et al. | 429/13 |
| 2004/0241065 A1 | 12/2004 | Kampa et al. | |
| 2004/0253496 A1 | 12/2004 | Foster | 429/30 |
| 2005/0008908 A1 | 1/2005 | Kaye et al. | |
| 2005/0013771 A1 | 1/2005 | Amendola | 423/658.2 |
| 2005/0014044 A1 | 1/2005 | Thirukkovalur et al. | 429/26 |
| 2005/0016840 A1 | 1/2005 | Petillo | 204/248 |
| 2005/0017216 A1 | 1/2005 | Poetsch et al. | 252/299.61 |
| 2005/0017646 A1 | 1/2005 | Boulos et al. | 315/111.41 |
| 2005/0031925 A1 | 2/2005 | Ofer et al. | |
| 2005/0036941 A1 | 2/2005 | Bae et al. | |
| 2005/0038267 A1 | 2/2005 | Poetsch et al. | 549/294 |
| 2005/0058595 A1 | 3/2005 | Shi et al. | 423/657 |
| 2005/0058990 A1 | 3/2005 | Guia et al. | |
| 2005/0084723 A1 | 4/2005 | Mori | |
| 2005/0106097 A1 | 5/2005 | Graham et al. | |
| 2005/0118470 A1 | 6/2005 | Harada et al. | |
| 2005/0124016 A1 | 6/2005 | LaDu et al. | 435/7.92 |

| | | | | | |
|---|---|---|---|---|---|
| 2005/0132640 A1 | 6/2005 | Kelly et al. ............... 44/301 | 2008/0015361 A1 | 1/2008 | Khare et al. |
| 2005/0135996 A1 | 6/2005 | Ortega et al. ............ 423/648.1 | 2008/0063913 A1 | 3/2008 | Hirayama |
| 2005/0136300 A1 | 6/2005 | Dyer | 2009/0025293 A1 | 1/2009 | Patton et al. |
| 2005/0148091 A1 | 7/2005 | Kitaguchi et al. | | | |
| 2005/0162122 A1 | 7/2005 | Dunn et al. ............... 320/101 | | | |
| 2005/0233184 A1 | 10/2005 | Dunn et al. ............... 429/12 | | | |
| 2005/0238573 A1 | 10/2005 | Zhang et al. ............ 423/648.1 | | | |
| 2005/0247552 A1 | 11/2005 | TeGrotenhuis et al. | | | |
| 2005/0268555 A1 | 12/2005 | Amendola et al. ............ 48/61 | | | |
| 2005/0271905 A1 | 12/2005 | Dunn et al. | | | |
| 2005/0276727 A1 | 12/2005 | Pawliszyn et al. | | | |
| 2005/0276746 A1 | 12/2005 | Zhang et al. ............... 423/651 | | | |
| 2006/0006108 A1 | 1/2006 | Arias et al. | | | |
| 2006/0008687 A1 | 1/2006 | Kaye et al. | | | |
| 2006/0014069 A1 | 1/2006 | Kaye et al. | | | |
| 2006/0014070 A1 | 1/2006 | Kaye et al. | | | |
| 2006/0021279 A1 | 2/2006 | Mohring et al. ............ 48/61 | | | |
| 2006/0024543 A1 | 2/2006 | Kaye et al. | | | |
| 2006/0024553 A1 | 2/2006 | Kaye et al. | | | |
| 2006/0024554 A1 | 2/2006 | Kaye et al. | | | |
| 2006/0029848 A1 | 2/2006 | Kaye et al. | | | |
| 2006/0058527 A1 | 3/2006 | Kirsch et al. ............ 544/333 | | | |
| 2006/0059778 A1 | 3/2006 | Shurtleff et al. | | | |
| 2006/0073365 A1 | 4/2006 | Kaye | | | |
| 2006/0090397 A1 | 5/2006 | Edlund et al. | | | |
| 2006/0102489 A1 | 5/2006 | Kelly ............... 205/357 | | | |
| 2006/0102491 A1 | 5/2006 | Kelly et al. ............ 205/407 | | | |
| 2006/0141332 A1 | 6/2006 | Cortright et al. | | | |
| 2006/0144701 A1 | 7/2006 | Kelly ............... 204/267 | | | |
| 2006/0169593 A1 | 8/2006 | Xu et al. ............ 205/406 | | | |
| 2006/0172162 A1 | 8/2006 | Pearson | | | |
| 2006/0191198 A1 | 8/2006 | Rosenzweig et al. | | | |
| 2006/0191199 A1 | 8/2006 | Rosenzweig et al. | | | |
| 2006/0196112 A1 | 9/2006 | Berry et al. ............ 44/550 | | | |
| 2006/0210841 A1 | 9/2006 | Wallace et al. ............ 429/12 | | | |
| 2006/0225350 A1 | 10/2006 | Spallone et al. ............ 48/198.2 | | | |
| 2006/0236606 A1 | 10/2006 | Strizki et al. ............ 48/127.9 | | | |
| 2006/0269470 A1 | 11/2006 | Zhang et al. ............ 423/648.1 | | | |
| 2006/0292067 A1 | 12/2006 | Zhang et al. ............ 423/648.1 | | | |
| 2006/0292420 A1 | 12/2006 | Goto et al. | | | |
| 2006/0293173 A1 | 12/2006 | Zhang et al. ............ 502/182 | | | |
| 2007/0011251 A1 | 1/2007 | McNamara et al. ........ 709/206 | | | |
| 2007/0020510 A1 | 1/2007 | Dunn et al. ............ 429/65 | | | |
| 2007/0081939 A1 | 4/2007 | Berry et al. | | | |
| 2007/0099039 A1 | 5/2007 | Galloway | | | |
| 2007/0116600 A1 | 5/2007 | Kochar et al. | | | |
| 2007/0189940 A1 | 8/2007 | Shurtleff et al. | | | |
| 2007/0212281 A1 | 9/2007 | Kadlec et al. | | | |
| 2007/0243431 A1 | 10/2007 | Zhu et al. | | | |
| 2007/0244324 A1 | 10/2007 | Brady et al. | | | |
| 2007/0271844 A1 | 11/2007 | Mohring et al. | | | |
| 2007/0274904 A1 | 11/2007 | Popham et al. | | | |
| 2007/0287054 A1 | 12/2007 | Ueda et al. | | | |

FOREIGN PATENT DOCUMENTS

JP  59078901  10/1982

OTHER PUBLICATIONS

"VI.B.4 DOE Chemical Hydrogen Storage Center of Excellence" Tumas, W. et al., FY 2005 Progress Report.

"Review of Chemical Processes for the Synthesis of Sodium Borohydride" Wo, Y. et al., Millennium Cell Inc., Aug. 2004.

"A safe, portable, hydrogen gas generator using aqueous borohydride solution and Ru catalyst" Amendola, S.C. et al., International Journal of Hydrogen Energy 25 (2000) 969-975.

Messina-Boyer, Chris. "Millennium Cell Receives Patent on System for Hydrogen Generation," Millennium Cell, Inc., Eatontown, NEWS, Mar. 18, 2003.

"A Novel High Power Density Borohydride-Air Cell," Amendola S.C. et al., Journal of Power Sources, vol. 84, No. 1, Nov. 1999, pp. 130-133(4).

"Enabling Fuel Cells for Standby Power-Chemical Hydride Fueling Technology," Smith, G.M., et al. Millennium Cell Inc., Eatontown, Telecommunications Energy Conference, Sep. 19-23, 2004.

"Recent Advances in Hydrogen Storage in Metal-Containing Inorgainc Nanostructures and Related Materials," Seayad, A.M., et al. Copyright 2004 May 19, 2004.

"Hydrogn Generation Via Sodium Borohydride," Mohring, R.M., et al. Millennium Cell, Inc., Eatontown, AIP Conference Proceedings-Jul. 11, 2003-vol. 671, Issue 1, pp. 90-100.

"Solid Storage," Luzader, R., Millennium Cell, Inc., Eatontown, News, Jun./Jul. 2003.

"Will Fuel Cells Replace Batteries in Mobile Devices?" Paulson, L.D. Millennium Cell, Inc.' Eatontown, News, Nov. 2003.

PCT/US2009/46638, International Search Report and Written Opinion, Jul. 21, 2009.

"Catalytic Reformer and Refinery Hydrogen System," Pall Corporation Copyright 1996, East Hills, New York.

"Dollinger Hydrogen Purification System," B & H Dollinger Filters, May 8, 2008, http://www.bhindust.com/dollinger/Dollinger_Hydrogen_Purification_System.htm.

"Recovery and Purification of Hydrogen Using PSA Technology," NATCO, May 8, 2008, http://www.natcogroup.com/Content.asp?t=ProductPage&ProductID=70.

QuestAir H-3200: Hydrogen Purification PSA System, QuestAir Technologies, British Columbia, Canada 2008.

Amendola et al., "A Safe, Portable, Hydrogen Gas Generator Using Aqueous Borohydride Solution and Ru Catalyst", International Journal of Hydrogen Energy, 2000, 25, pp. 969-975.

APPARATUS, SYSTEM, AND METHOD FOR GENERATING A GAS FROM SOLID REACTANT POUCHES

CROSS-REFERENCES TO RELATED APPLICATIONS

This application claims priority to U.S. Provisional Patent Application Ser. No. 61/059,743 entitled "Apparatus, System, and Method for Generating Hydrogen from a Feed of Hydride Pouches" filed on Jun. 6, 2008, which is abandoned, is a continuation-in-part of and claims priority to U.S. patent application Ser. No. 11/740,349, now U.S. Pat. No. 7,556,660 entitled "Apparatus, System, and Method for Promoting a Substantially Complete Reaction of an Anhydrous Hydride Reactant" filed on Apr. 26, 2007 having a priority date of Jun. 11, 2003, and incorporates by reference U.S. patent application Ser. No. 10/459,991 filed Jun. 11, 2003, issued as U.S. Pat. No. 7,393,369, Ser. No. 11/270,947 filed Nov. 12, 2005, issued as U.S. Pat. No. 7,438,732, Ser. No. 11/828,265 filed Jul. 25, 2007, which is abandoned, Ser. No. 11/829,019 filed Jul. 26, 2007, issued as U.S. Pat. No. 7,651,542, Ser. No. 11/829,035 filed Jul. 26, 2007, issued as U.S. Pat. No. 7,648,786, 60/951,903 filed Jul. 25, 2007, 60/951,907 filed Jul. 25, 2007, 60/951,925 filed Jul. 25, 2007, each of which is incorporated by reference herein in its entirety.

BACKGROUND OF THE INVENTION

1. Field of the Invention

This invention relates to gas generation and more particularly relates to gas generation from solid reactant pouches.

2. Description of the Related Art

The portable generation of various gasses has many uses. Hydrogen is a desirable energy source. Oxygen has medical and emergency uses, as well as industrial uses. Hydrocarbon gasses, such as methane, are also desirable energy sources. Producing pure gasses using conventional methods is generally cost prohibitive or requires storing the gas at high pressures.

One way that pure gasses can be generated is through a chemical reaction which produces molecules of the desired gas. The chemical reaction that occurs between water ($H_2O$) and chemical hydrides produces pure hydrogen. Chemical hydrides are molecules comprising hydrogen and one or more alkali or alkali-earth metals, or other elements. Chemical hydrides can produce large quantities of pure hydrogen when reacted with water.

Recently, the interest in hydrogen generation has increased, because of the development of lightweight, compact Proton Exchange Membrane (PEM) fuel cells. One byproduct of generating electricity with a PEM fuel cell is water, which can be used or reused to produce pure hydrogen from chemical hydrides for fuelling the PEM fuel cell. The combination of PEM fuel cells with a chemical hydride hydrogen generator offers advantages over other energy storage devices in terms of gravimetric and volumetric energy density. Interest in portable and local generation of other gasses has also increased.

Unfortunately, there are several unresolved problems producing pure gasses from chemical reactions. Specifically, conventional systems, methods, and apparatuses have not successfully controlled chemical reactions between reactants without adversely affecting the gravimetric and volumetric energy density of the overall system. This lack of control also prevents conventional systems, methods, and apparatuses from meeting dynamic gas demands of new devices like PEM fuel cells.

Many chemical reactions that produce gasses are very severe and highly exothermic. The combination of reactants must be precisely controlled to prevent a runaway reaction or an explosion. Many failed attempts have been made to properly control the reactions while still preserving the gravimetric and volumetric energy density provided by the reactants.

Another side effect of such a system is that the reactants will "gum" or "clump" as the reactants are introduced. Gumming or clumping refers to the clumps formed by the reactants and their byproducts during the reaction. Often, a liquid reactant is able to react with the outer portion of the "clump" to a certain depth, while large portions of the "clump" remain un-reacted. Consequently, the gravimetric and volumetric energy density is decreased because of the large percentage of reactants that remain un-reacted. This is inefficient and greatly increases the amount of reactants that such systems use to create a given amount of gas.

SUMMARY OF THE INVENTION

From the foregoing discussion, it should be apparent that a need exists for an apparatus, system, and method that promote a substantially complete reaction of reactants. Beneficially, such an apparatus, system, and method would be dynamically controllable to satisfy the varying gas generation requirements of a variety of gas consuming devices.

The present invention has been developed in response to the present state of the art, and in particular, in response to the problems and needs in the art that have not yet been fully solved by currently available gas generation techniques. Accordingly, the present invention has been developed to provide an apparatus, system, and method for gas generation that overcome many or all of the above-discussed shortcomings in the art.

The apparatuses and the system to generate a gas are provided with a plurality of elements configured to functionally execute the necessary steps of generating a gas produced by a reaction of a solid anhydrous reactant and a liquid reactant. These elements in the described embodiments include one or more liquid permeable pouches, a reaction chamber, one or more reactant inlets, a gas outlet, a pouch feeder, a pouch source, a used pouch source, a cooling system, and a filtration module.

The one or more liquid permeable pouches, in one embodiment, each define a cavity comprising a solid anhydrous reactant. In a further embodiment, the solid anhydrous reactant has a chemical hydride and an anhydrous activating agent. In another embodiment, the solid anhydrous reactant gas is a chlorate, a perchlorate, a superoxide, or an ozonide. In one embodiment, the one or more pouches have a heat diffusion layer disposed adjacent to the solid anhydrous reactant so that the heat diffusion layer transfers heat from the solid anhydrous reactant.

The one or more pouches, in one embodiment, have a protective covering. In another embodiment, the protective covering has a water impermeable high temperature thin film plastic. The one or more pouches, in a further embodiment, are foldably coupled to each other in series. In another embodiment, the one or more pouches are independent of each other. In one embodiment, the one or more pouches have an alignment structure. In another embodiment, the one or more pouches are marked with an identification device such as a barcode and an RFID tag.

In one embodiment, the reaction chamber comprises a heat and pressure resistant material and receives the one or more pouches and a liquid reactant. The liquid reactant, in one embodiment, comprises water. In another embodiment, the liquid reactant comprises an alcohol or a peroxide. The reaction chamber, in one embodiment, is removable. In one embodiment, there is a second reaction chamber that receives a portion of the one or more pouches from the pouch feeder and a portion of the liquid reactant from the one or more liquid sources.

The one or more reactant inlets, in a further embodiment, join the one or more pouches and the liquid reactant by contacting at least a portion of the one or more pouches with the liquid reactant. In another embodiment, the one or more reactant inlets have one or more liquid sources that inject the liquid reactant into the reaction chamber. In one embodiment, the one or more liquid sources inject the liquid reactant at an injection rate. The one or more reactant inlets, in a further embodiment, transfer the one or more pouches into the reaction chamber successively at a feed rate that corresponds to the injection rate.

The gas outlet releases a gas produced by a reaction between the solid anhydrous reactant and the liquid reactant. In one embodiment, the gas comprises hydrogen. In another embodiment, the gas comprises oxygen. In a further embodiment, the gas comprises ammonia, borazine, nitrogen, or a hydrocarbon.

In one embodiment, the pouch feeder transfers the one or more pouches into the reaction chamber successively at a feed rate. In another embodiment, the transfer of the one or more pouches by the pouch feeder and the injection of the liquid reactant by the one or more liquid sources are both initiated by a single actuator. In a further embodiment, the transfer of the one or more pouches by the pouch feeder and the injection of the liquid reactant by the one or more liquid sources are independently initiated. The pouch feeder, in another embodiment, has one or more rollers, and at least one of the rollers presses excess liquid from the one or more pouches in response to a substantial completion of the reaction in at least a portion of the one or more pouches.

In one embodiment, the pouch feeder punctures a protective covering on the one or more pouches. In another embodiment, the one or more liquid sources inject the liquid reactant through the pouch feeder. The pouch feeder, in one embodiment, receives an alignment structure that is on the one or more pouches. In a further embodiment, the pouch feeder loads each of the one or more pouches separately. In another embodiment, the pouch feeder loads a series of coupled pouches.

The pouch source, in one embodiment, stores an unused portion of the one or more liquid permeable pouches. The used pouch source, in one embodiment, receives a used portion of the one or more pouches from the reaction chamber. In one embodiment, the pouch source and the used pouch storage occupy a single chamber.

The cooling system, in one embodiment, is disposed in substantially direct contact with the reaction chamber. In one embodiment, the cooling system has a heat-sink and a fan. The filtration module, in one embodiment, removes contaminants from the produced gas. In another embodiment, the filtration module removes liquids from the produced gas and sends the liquids to the one or more liquid sources. The filtration module, in a further embodiment, is removable and replaceable. The filtration module, in another embodiment, is marked with an identification device such as a barcode or an RFID tag.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are presented to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
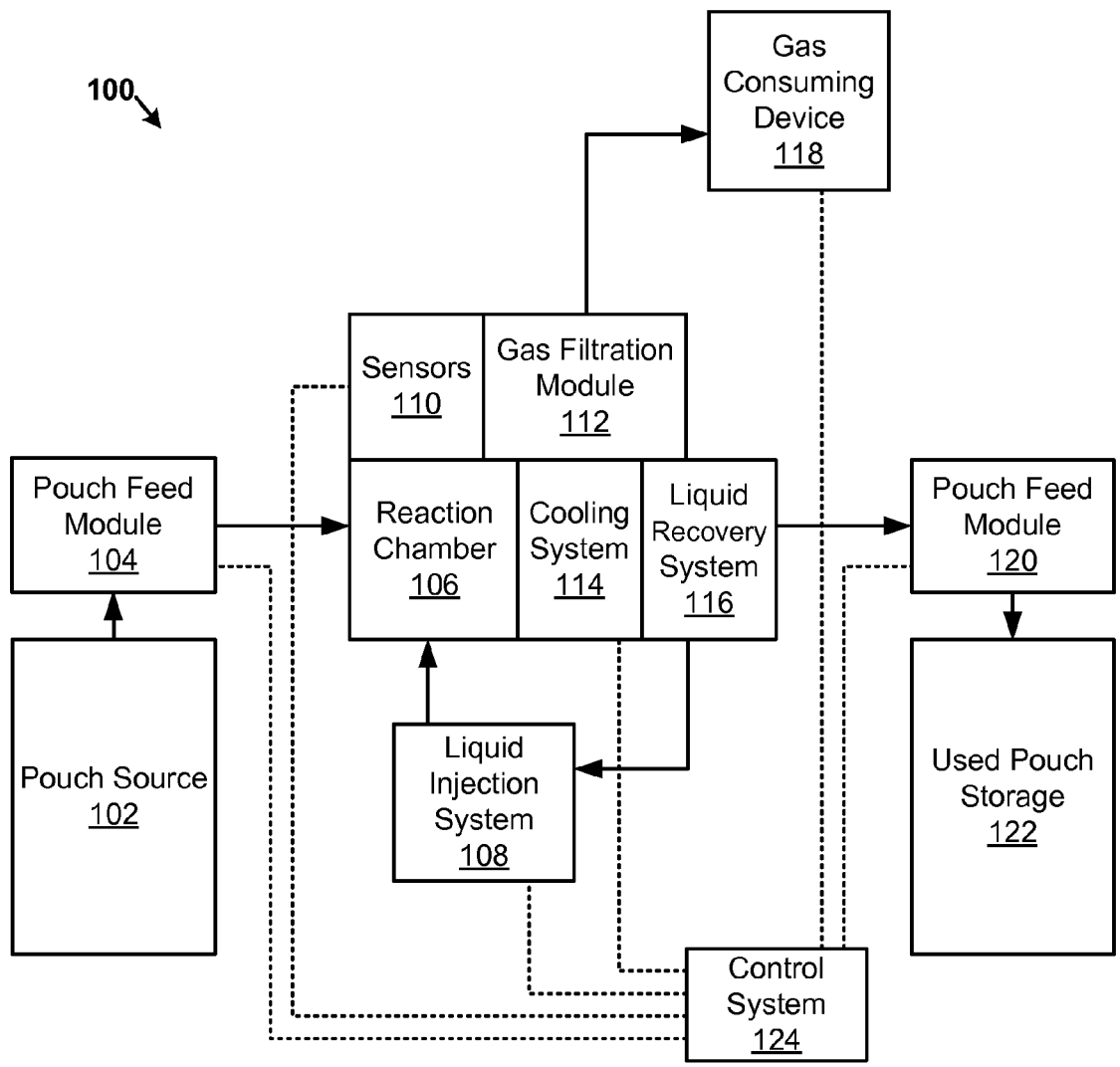
FIG. 1 is a schematic block diagram illustrating one embodiment of a system for generating a gas from solid reactant pouches in accordance with the present invention.

FIG. 1 depicts one embodiment of a system 100 for generating a gas. In one embodiment, the system 100 comprises a pouch source 102, a first pouch feeder 104, a reaction chamber 106, a liquid injection system 108, one or more sensors 110, a gas filtration module 112, a cooling system 114, a liquid recovery system 116, a gas consuming device 118, a second pouch feeder 120, a used pouch storage 122, and a control system 124. Those of skill in the art recognize that different embodiments may include or exclude certain of the components of the system 100. For example, depending on the pouch configuration, solid reactant, and use of the system (portable vs. non-portable), the system may or may not include a liquid recovery system 116, cooling system 114, or second pouch feeder 120, in certain embodiments. In another example, the gas consuming device 118 is external to the system 100 and receives the generated gas through an opening or line or the like.

In one embodiment, the pouch source 102 comprises one or more solid reactant pouches. Embodiments of solid reactant pouches are described below in greater detail with regard to FIG. 2, FIG. 3A, and FIG. 3B. The one or more solid reactant pouches, in one embodiment, comprise a liquid permeable material having one or more cavities. The liquid permeable material may fully enclose the one or more cavities or may enclose a portion of the one or more cavities. The one or more solid reactant pouches may comprise textile, fabric, paper, synthetic, polymer, composite, and/or other materials. In one embodiment, at least a portion of the solid reactant pouches is liquid permeable. The one or more solid reactant pouches may further be sewn, bonded, machined, molded, cast, or otherwise formed to define the one or more cavities. The one or more solid reactant pouches may fully enclose the one or more cavities or may define a cavity that includes one or more openings.

Each of the one or more cavities may contain a solid anhydrous reactant. The solid anhydrous reactant is a chemical compound that reacts with a liquid reactant to release a gas, such as hydrogen, oxygen, ammonia, nitrogen, borazine, a hydrocarbon, and the like. The gas may comprise elemental material from the solid reactant, from the liquid reactant, or may be a combination of the two.

In certain embodiments, the one or more cavities may comprise a solid anhydrous activating agent. When a liquid reactant and the solid reactant pouches are introduced, the activating agent may be configured to facilitate a chemical reaction between the solid reactant and the liquid reactant to produce a gas. The solid reactant may comprise a chemical hydride, metals or metal derivatives, chlorate compounds, perchlorate compounds, superoxide compounds, ozonide compounds, ammonia-containing compounds, and the like.

Examples of chemical hydrides include, but are not limited to, sodium borohydride, lithium borohydride, lithium aluminum hydride, lithium hydride, sodium hydride, calcium hydride, and the like. Other examples include high hydrogen density chemical hydrides such as ammonia borane, and diboranoamides such as lithium diboranoamide. Examples of metals and metal derivatives include compounds containing alkali metals, alkali earth metals, transition metals, post transition metals, and the like. In one embodiment, metals or metal derivatives that oxidize are used, such as sodium, lithium, potassium, aluminum, and iron containing compounds. Examples of chlorate compounds include $KClO_3$, $NaClO_3$, $Mg(ClO_3)_2$, and the like. Examples of perchlorate compounds include $KCl_4$, $NH_4ClO_4$, $LiClO_4$, $NaClO_4$, and the like. Examples of superoxides include $KO_2$, $NaO_2$, and the like. Examples of Ozonides include $LiO_3$, $NaO_3$, $CsO_3$, and the like. Examples of ammonia containing compounds include $NH_4Cl$ and the like. Examples of activating agents are given below with regard to FIGS. 3A and 3B.

Many types of solid anhydrous reactants may be reacted with various liquid reactants to produce a wide variety of gasses. For example, a reaction between sodium borohydride and water ($NaBH_4 + 2H_2O \rightarrow NaBO_2 + 4H_2$) produces hydrogen gas and a sodium borate byproduct. Other hydrides, when similarly reacted with water, will produce hydrogen gas with different byproducts.

In another example, to generate ammonia gas, a solid reactant such as lithium nitride may be reacted with a liquid reactant such as water to produce ammonia gas and a lithium hydroxide byproduct ($LiN + 3H_2O \rightarrow 3LiOH + NH_3$). Another example that may be used for ammonia gas generation is a combination of magnesium nitride as a solid reactant, and water as a liquid reactant to produce ammonia gas and a magnesium hydroxide byproduct ($Mg_3N_2 + 6H_2O \rightarrow 3Mg(OH)_2 + 2NH_3$).

One example of a reaction to produce nitrogen gas, is the reaction between sodium nitrite and ammonium chloride to produce nitrogen gas, with sodium chloride and water byproducts ($NaNO_2(aq) + NH_4Cl(aq) \rightarrow N_2 + 2H_2O + NaCl$). Because the sodium nitrite and the ammonium chloride react in solution, but not as solids, a liquid reactant such as water can be delivered to the solid anhydrous reactants, and the reaction will begin once the solid reactants begin to dissolve, even though the liquid reactant is not a member of the reaction directly.

To generate borazine gas, in another example, lithium borohydride and ammonium chloride may be reacted to produce borazine gas with lithium chloride and hydrogen as byproducts ($3LiBH_4 + 3NH_4Cl \rightarrow B_3H_6N_3 + 3LiCl + 9H_2$). Another example of reactants that may be used to generate borazine gas are trichloroborazine and sodium borohydride, which produce borazine gas with boron hydride and sodium chloride byproducts ($Cl_3B_3H_3N_3 + 3NaBH_4 \rightarrow B_3N_3H_6 + 3/2 B_2H_6 + 3NaCl$).

Several oxidizing reactions with organic compounds may be used to produce various hydrocarbon gasses. For example, reacting an alkene and potassium permanganate with water produces a diol/glycol with byproducts of manganese dioxide and potassium hydroxide ($R-C=C-R + 2KMNO_4 + H_2O \rightarrow a\ diol/glycol + 3MnO_2 + 2KOH$). Different diols/glycols may be produced, depending on the alkene that is used in the reaction.

Some solid reactants may be used to generate multiple types of gasses, depending on the liquid reactant used. For example, while chemical hydrides are typically used to produce hydrogen, and chlorate, perchlorate, superoxide, and ozonide compounds are typically used to produce oxygen, many metals and metal derivatives may be used to produce hydrogen, oxygen, or other gasses depending on the liquid reactant that is used. Other reactions may produce multiple types of gasses, which may be used together, separated, used individually, and/or discarded as byproducts. Additionally, in the example reactions listed above and in other reactions, some reactants may be used as either solid reactants or as liquid reactants, by dissolving or suspending a reactant in a liquid and delivering it to different solid reactant within the solid reactant pouches.

The solid reactant pouches may comprise textile, paper, a composite material, or other material that is water soluble and maintains substantial structural integrity at temperatures ranging from about −20° C. to about 200° C., and at a pH ranging from about 4 to about 14. The solid reactant pouches may also act as filters to filter particles from produced gasses. In one embodiment, the solid reactant pouches may also have a heat diffusion layer. The heat diffusion layer may comprise a portion of or wall of the pouches that is heat conductive, a separate sheet or layer within the pouches, a powder disposed within the pouches adjacent to the solid reactant, or another type of heat diffusion layer. The heat diffusion layer and the solid reactant pouches are discussed in greater detail with regard to FIGS. 3A and 3B.

In one embodiment, the pouch source 102 comprises a container configured to store the solid reactant pouches. The pouch source 102, in a further embodiment, protects the solid reactant pouches from external influences such as humidity, contaminants, and the like, and also isolates the solid reactant pouches from contact with a user of the system 100. In one embodiment, the pouch source 102 is configured to store multiple solid reactant pouches that are coupled to each other in series to facilitate removal from the pouch source 102. The solid reactant pouches may be foldably coupled to each other, so that they may be easily stored in the pouch source 102. In a further embodiment, a first pouch in a group of coupled solid reactant pouches may comprise an alignment structure, such as a tab, hook, hole, string, or the like, to further facilitate removal of the group of coupled solid reactant pouches sequentially from the pouch source 102.

In one embodiment, the solid reactant pouches further comprise a protective coating, container, or packaging that protects each of the solid reactant pouches from external influences and isolates the solid reactant pouches from contact with a user prior to the time when the solid reactant pouches are placed into the pouch source 102. The protective coating may also protect each solid reactant pouch from contact with other solid reactant pouches within the pouch source 102. The protective coating may be made from plastic, paper, textiles, or the like, and may be selected based on the type of solid reactant stored in the solid reactant pouches. In one embodiment, the protective coating remains on the solid reactant pouches when they are removed from the pouch source 102. In another embodiment, the container or the packaging is configured to remain in the pouch source 102 when the solid reactant pouches are removed from the pouch source 102.

The pouch source 102, in one embodiment, is constructed from a durable material such as a metal, polymer, or the like. In a further embodiment, the durable material may be selected to be light weight, or to withstand humidity, temperature, or rugged conditions. In one embodiment the pouch source 102 is fixedly attached to the system 100 to reduce the weight of the system 100. In another embodiment, the pouch source 102 is detachable from the system 100 to facilitate replacement or cleaning of the pouch source 102. In a further embodiment, the pouch source 102 and the solid reactant pouches may be packaged together as a single component and removably attached to the system 100.

In one embodiment, the first pouch feeder 104 is configured to remove solid reactant pouches from the pouch source 102 and to introduce them into the reaction chamber 106. The first pouch feeder 104 may introduce solid reactant pouches into the reaction chamber 106 through a reactant inlet, such as a pouch inlet. The first pouch feeder 104 may comprise one or more rollers, levers, gears, wheels, belts, or the like. The first pouch feeder 104 may use friction or may interface with structures on the solid reactant pouches to move the solid reactant pouches. In one embodiment, an alignment structure, such as a tab or the like as described above, on a first solid reactant pouch in a group of coupled solid reactant pouches is initially fed through the first pouch feeder 104 to facilitate the loading of the coupled solid reactant pouches into the first pouch feeder 104. The alignment structure may be manually fed through the first pouch feeder 104, or may be automatically or otherwise retrieved by the first pouch feeder 104.

In one embodiment, the alignment structure is configured to be placed into a receiving structure, such as a slot or other opening, which places the alignment structure into contact with the first pouch feeder 104. In another embodiment, the solid reactant pouches are not coupled, and the first pouch feeder 104 is configured to load each solid reactant pouch individually. In an embodiment where the solid reactant pouches are not coupled to each other, the first pouch feeder 104 may use gravity, a spring-loaded device, a motor, individual alignment structures, and the like to load each solid reactant pouch.

In one embodiment, the first pouch feeder 104 may be configured to breakup, crush, or separate compressed solid reactant in the solid reactant pouches. The first pouch feeder 104 may further be configured to puncture an outer coating or packaging of the solid reactant pouches. For example, the first pouch feeder 104 may comprise one or more rollers, levers, wheels, gears, belts, or the like with protrusions configured to puncture an outer coating or packaging of the solid reactant pouches as the first pouch feeder 104 moves the solid reactant pouches.

The punctures may be configured to allow liquid reactant to enter the solid reactant pouches and generated gas to exit the solid reactant pouches. In a further embodiment, the first pouch feeder 104 may be integrated with the liquid injection system 108, and may inject the liquid reactant into or onto the solid reactant pouches as the first pouch feeder 104 moves the solid reactant pouches. The puncturing protrusions, needles, or the like may comprise integrated liquid injection structures such that they puncture an outer coating or packaging of the solid reactant pouches and inject a liquid reactant into the puncture openings.

In one embodiment, the first pouch feeder 104 comprises a heat conductive material, such that heat from a reaction between the liquid reactant and the solid reactant is dissipated by the first pouch feeder 104 when the first pouch feeder 104 contacts a solid reactant pouch. A first pouch feeder 104 with a larger surface area may be selected to increase the cooling efficiency of the first pouch feeder 104. For example, in one embodiment, the pouch feeder comprises one or more metal rollers that transfer heat from the solid reactant pouches.

In one embodiment, the reaction chamber 106 receives the solid reactant pouches from the first pouch feeder 104. One or more elements of the first pouch feeder 104 may be integrated with the reaction chamber 106 to facilitate loading of the solid reactant pouches into the reaction chamber 106. The reaction chamber 106 is configured to contain a gas producing reaction between the solid reactant in the solid reactant pouches and a liquid reactant introduced into the reaction chamber 106 by the liquid injection system 108, and to controllably release the gas generated by the reaction. The reaction chamber 106 may comprise reactant inlets, such as a pouch inlet and a liquid reactant inlet, through which the reaction chamber 106 receives the solid reactant pouches and the liquid reactant. The reaction chamber 106 may further comprise a gas outlet and a pouch outlet. The reaction chamber 106, in one embodiment, may be sized to enclose a single solid reactant pouch, or alternatively may be sized to enclose multiple solid reactant pouches.

The reaction chamber 106 may comprise a durable material that is configured to withstand the high temperatures and pressures associated with gas generation. The durable material may also be a lightweight material to decrease the overall weight of the system 100 and to increase the portability of the system 100. Example materials include metals, metal alloys, polymers, ceramics, and other durable materials. One such lightweight, durable material is aluminum. In another embodiment, a coating, packaging, lining, or the like around a solid reactant pouch acts as a pseudo-reaction chamber within the reaction chamber 106, substantially containing the reaction between the liquid reactant and the solid reactant, and enclosing at least a portion of the heat, steam, and the like generated by the reaction. In a further embodiment, the interior of the reaction chamber 106 is coated to prevent a chemical reaction between the solid reactant in the solid reactant pouches and a wall of the reaction chamber 106.

The reaction chamber 106, in one embodiment, may comprise a seal or the like that prevents at least some amount of liquid, steam, gas, and the like from exiting the reaction chamber 106 and entering the pouch source 102, but allows the first pouch feeder 104 to feed solid reactant pouches into the reaction chamber 106. The seal may comprise a flexible flap made of silicone, rubber, or the like. The reaction chamber 106 may comprise a similar seal configured to prevent at least some amount of liquid, steam, gas, and the like from exiting the reaction chamber 106 and entering the used pouch storage 122. In one embodiment, the reaction chamber 106 is removable from the system 100 to facilitate cleaning, maintenance, replacement, and the like of the reaction chamber 106.

In one embodiment, the system 100 is configured to include multiple reaction chambers 106 to increase the gas output of the system 100. The multiple reaction chambers 106 may each receive solid reactant pouches from the pouch source 102 and liquid reactant from the liquid injection system 108, or may each have separate pouch sources and liquid reactant sources. Other elements of the system 100, such as the cooling system 114, the gas filtration module 112, the liquid recovery system 116, the used pouch storage 122, and the control system 124 may be shared by multiple reaction chambers 106, or may be unique to a single reaction chamber 106.

In one embodiment, the liquid injection system 108 delivers a liquid reactant to the reaction chamber 106. The liquid reactant, in one embodiment comprises water. In a further embodiment, the liquid reactant may comprise an alcohol, such as methanol and the like, so that the system 100 can operate in temperatures below the freezing point of water. In another embodiment, the liquid reactant may comprise a peroxide. The liquid reactant is selected based on the desired reaction between the solid reactant and the liquid reactant, and the desired gas produced by the reaction. In yet a further embodiment, the liquid reactant may comprise an acid, a base, or an activating agent mixed with water.

The liquid injection system 108 may store the liquid reactant, may receive the liquid reactant directly from another liquid source, or both. In one embodiment, the liquid injection system 108 comprises a liquid reservoir. In a further embodiment, the liquid reservoir comprises a collapsible membrane or bladder such that the system 100 may be oriented independent of gravity and other forces. The liquid injection system 108 may also comprise one or more liquid pumps, pipes, tubes, manifolds, misters, sprayers, nozzles, injectors, ports, inlets, and the like to facilitate liquid reactant delivery to a solid reactant pouch in the reaction chamber 106. The liquid injection system 108 may deliver the liquid reactant as a liquid stream, as a mist or aerosol, as a vapor, as a pooled amount of liquid reactant within the reaction chamber 106, or otherwise such that the liquid reactant contacts at least a portion of the solid reactant pouches in some fluid form.

The liquid injection system 108, in one embodiment, delivers a controlled amount of the liquid reactant directly into or onto each solid reactant pouch in the reaction chamber 106. The controlled amount of the liquid reactant may be stoichiometrically calculated to provide a complete reaction with the solid reactant within a pouch without excess liquid reactant, or may be determined from previous measurements or observation. The liquid injection system 108 may deliver the liquid reactant in discrete pulses, or may deliver the liquid reactant as a substantially constant, variable volume flow. In one embodiment, the liquid injection system 108 comprises a pump that is configured to deliver a discrete or controllable amount of liquid reactant. Alternatively, or in addition, the liquid injection system 108 may deliver the liquid reactant using gravity or with the assistance of gravity, or using another force such as a compression force from a collapsible membrane or bladder or the like.

One example of a pump for the liquid injection system 108 is a peristaltic pump. Use of a peristaltic pump may be advantageous because a peristaltic pump does not contaminate the liquid that it pumps, is inexpensive to manufacture, and pumps a consistent, discrete amount of liquid in each pulse. Advantageously, a peristaltic pump also provides a consistent and discrete amount of liquid regardless of any backpressure in the liquid being pumped.

The liquid injection system 108 may deliver the liquid reactant to a solid reactant pouch in the reaction chamber 106 through one or more tubes, needles, inlets, manifolds or the like within the reaction chamber 106. As described above, in another embodiment, the liquid injection system 108 may deliver the liquid reactant to a solid reactant pouch through the first pouch feeder 104.

The injection of liquid reactant by the liquid injection system 108 may be coordinated with the movement of the solid reactant pouches through the reaction chamber 106 to facilitate a full, consistent reaction of the solid reactant within the solid reactant pouches. In one embodiment a single mechanical action, or actuator, is configured to move a solid reactant pouch and to inject a discrete amount of liquid reactant onto or into the solid reactant pouch. For example, the single actuator may comprise a single motor that could drive a pump in the liquid injection system 108 and drive a roller, gear, belt, gear, lever, or the like in the first pouch feeder 104. In another embodiment, the transfer of solid reactant pouches by the first pouch feeder 104 and the injection of the liquid reactant by the liquid injection system 108 are independently initiated by separate actuators. The rate at which the liquid injection system 108 injects the liquid reactant, in one embodiment, may be determined by a gas pressure of the gas being generated, by a gas demand of the gas consuming device 118, or by a mixture or combination of the two.

In one embodiment, the one or more sensors 110 may comprise one or more of a temperature sensor, a gas pressure sensor, a pouch sensor, and other safety and/or status sensors. In one embodiment, the pouch sensor comprises an optical sensor, a switch, a lever, or another sensor capable of determining the presence of a solid reactant pouch within the reaction chamber 106, or at an entrance to the reaction chamber 106. In a further embodiment, the pouch sensor is configured to count the number of pouches that have passed through the reaction chamber 106, or to read an index such as a barcode, RFID tag, or the like on one or more of the solid reactant pouches.

In one embodiment, the one or more sensors 110 are configured to communicate safety information, status information, and/or gas output information to the control system 124 for processing. Alternatively, one or more of the sensors 110 may be arranged in a feedback circuit directly with other systems such as the first and second pouch feeders 104, 120, the liquid injection system 108, and the cooling system 114. For example, either through the control system 124 or through a direct feedback connection, the cooling system 114 may maintain a temperature based on a reading from the temperature sensor, and the first and second pouch feeders 104, 120 and the liquid injection system 108 may introduce solid reactant pouches and liquid reactant into the reaction chamber 106 based on readings from a gas pressure sensor or the like.

In one embodiment, the gas filtration module 112 is configured to remove one or more of particulates, excess water, reaction byproducts, and other impurities from the generated gas. The gas filtration module 112 may comprise one or more of a pre-filtration element that suspends large contaminants, a liquid condenser, a coalescer, and an organic filter. The gas filtration module 112 may be fixedly or removably coupled to the gas outlet of the reaction chamber 106.

In one embodiment, the gas filtration module 112 is removable and replaceable, and the system 100 is configured to alert a user when the gas filtration module 112 should be replaced based on the number of solid reactant pouches that have been used by the system 100. As described above, the number of solid reactant pouches that have been used may be tracked, calculated, or estimated by the one or more sensors 110 and/or the control system 124. The gas filtration module 112, in one embodiment, is in fluid communication with the liquid injection system 108, such that excess liquid removed from the generated gas by the gas filtration module 112 is returned to the liquid injection system 108. The gas filtration module 112 may be integrated with the cooling system 114, comprising one or more heat-sinks and/or fans to facilitate condensation of fluids from the generated gas. The same heat-sinks and/or fans may also be configured to cool used solid reactant packets exiting the reaction chamber before they enter the used pouch storage 122.

In one embodiment, the cooling system 114 is configured to substantially prevent the reaction chamber 106 from reaching a predetermined unsafe temperature. The cooling system 114 may comprise one or more heat-sinks, fans, blowers, liquid cooling systems, and other cooling elements. In one embodiment, the cooling system 114 comprises a heat-sink mounted directly to the reaction chamber 106. In a further embodiment, a fan is attached to the heat-sink. The cooling system 114 may be controlled by the control system 124, by a direct feedback signal from a temperature sensor 110, or may be constantly operated during gas production.

Thermal management of the solid reactant in a solid reactant pouch during hydrolysis helps maintain a stable, consistent reaction. In one embodiment, the cooling system 114 may use a standard heat-sink and fan such as are often used to cool processors and other computer system components. As used herein, hydrolysis is a chemical reaction during which one or more water molecules are split into hydrogen and hydroxide ions which may go on to participate in further reactions. As described above with relation to the first pouch feeder 104 and the gas filtration module 112, the cooling system 114 may be integrated with other elements and systems such as the first and second pouch feeders 104, 120, the gas filtration module 112, and the liquid recovery system 116. The cooling system 114, in another embodiment, may comprise one or more air cooling channels between the reaction chamber 106 and other elements such as the pouch source 102 and the used pouch storage 122.

In one embodiment, the liquid recovery system 116 is configured to recover unreacted liquid reactant from used solid reactant pouches as they exit the reaction chamber 106 and to communicate the unreacted liquid reactant to the liquid injection system 108. In a further embodiment, the liquid recovery system 116 comprises one or more rollers or other compressing means configured to press used solid reactant pouches, wringing or pressing unreacted liquid reactant from the used solid reactant pouches. The one or more rollers or other compressing means, in one embodiment, may be part of the second pouch feeding mechanism 120, moving used solid reactant pouches from the reaction chamber 106 to the used pouch storage 122 and removing unreacted liquid reactant from the pouches.

In one embodiment, the gas consuming device 118 receives generated gas from the reaction chamber 106. The gas consuming device 118 may receive the generated gas from the reaction chamber 106 directly or indirectly through the gas filtration module 112 or other intermediary elements. The gas consuming device 118 may comprise a hydrogen or hydrocarbon fuel cell system, a micro-turbine system or other combustion system, a gas storage tank, an engine, an oxygen delivery system, or another device that consumes, stores, or otherwise uses the generated gas. In one embodiment, the gas consuming device 118 is in communication with the control system 124. In a further embodiment, the gas consuming device 118 may communicate a request to the control system 124 for a specific amount or flow rate of generated gas, or for an increase or decrease in the amount or flow rate of the generated gas.

In one embodiment, the second pouch feeder 120 moves used solid reactant pouches from the reaction chamber 106 to the used pouch storage 122. The second pouch feeder, in one embodiment, may be substantially similar to the first pouch feeder 104, may be integrated with the first pouch feeder 104, or may be auxiliary to the first pouch feeder 104. The second pouch feeder 120, as described above, may be configured to remove liquid from the used solid reactant pouches. In another embodiment, the second pouch feeder 120 is configured to remove heat from used solid reactant pouches, as is described in relation to the first pouch feeder 104. The second pouch feeder 120 may function as part of the cooling system 114 and/or the liquid recovery system 116 as described above.

In one embodiment, the used pouch storage 122 receives used solid reactant pouches from the reaction chamber 106 through the second pouch feeder 120. The used pouch storage 122 may, in a further embodiment, allow the used solid reactant pouches to complete the chemical reaction and vent the produced gas back to the reaction chamber 106, or to the gas filtration module 112. The used pouch storage 122 may have similar properties and characteristics as those described above in relation to the pouch source 102. In one embodiment, the used pouch storage 122 is integrated with the pouch source 102, such that used pouches are stored in substantially the same area as unused pouches. For example, both the pouch source 102 and the used pouch storage 122 may occupy the same chamber. In one embodiment, a divider may separate the used pouch storage 122 from the pouch source 102, within the same or different chambers. In another embodiment, the divider may adjust its position based on the ratio of unused solid reactant pouches to used solid reactant pouches. In a further embodiment, the divider is fixed, and comprises an air cooling channel.

In one embodiment, the control system 124 may comprise one or more of an integrated circuit such as a micro-processor, an application specific integrated circuit (ASIC), a field programmable gate array (FPGA), an embedded controller, or the like, and related control circuitry. The control system 124, in one embodiment, is configured to control one or more control parameters of the system 100. Examples of control parameters include the movement of solid reactant pouches from the pouch source 102 through the reaction chamber 106 to the used pouch storage 122, the rate that the liquid injection system 108 injects liquid reactant into the reaction chamber 106, the temperature of the reaction chamber 106, and the like. By controlling these and other elements or parameters, the control system 124 may be configured to control the output amount or the flow rate of produced gas for the system 100. In a further embodiment, the control system 124 may be configured to receive signals from the one or more sensors 110 and/or the gas consuming device 118 to facilitate the control of the system 100.

In one embodiment, the control system 124 employs an algorithm to determine a liquid reactant injection rate and a corresponding solid reactant pouch loading rate or feed rate. In such an embodiment, the control system 124 receives input regarding gas demand from the gas consuming device 118 and a current gas pressure from one or more of the sensors 110. The control system 124 then sets the liquid reactant injection rate at a level that optimizes the use of the gas that will be produced from the solid reactant pouches by accommodating a production delay that is inherent in the generation of a gas from a solid reactant through a chemical reaction such as hydrolysis or the like. The production delay is a time delay between when the liquid reactant injection rate and the corresponding solid reactant pouch feed rate is changed and when the resulting change in the gas production rate occurs. Various algorithms may be used to determine an optimal liquid reactant injection rate. The control system 124 may determine the total gas flow rate desired from the gas consuming device 118 for the next cycle in the future (a cycle is the time between when the control system 124 determines whether or not to make an adjustment to the liquid reactant injection rate and the time when the control system 124 potentially makes such an adjustment).

The control system 124 may also determine whether the pressure of produced gas that has not yet been sent to the gas consuming device 118 is within an acceptable range. Too high of a pressure may cause safety concerns that trigger purging of the excess gas by the control system 124 or other safety devices. Too little gas pressure may exacerbate the production delay. The control system 124 may then define a liquid reactant injection rate and corresponding pouch feed rate that will increase or decrease gas production such that the pressure of produced gas that has not yet been sent to the gas consuming device 118 will come within the acceptable range (by either increasing or decreasing the gas pressure) and the total gas demand is met. The control system 124 may provide excess gas generation for storage as a gas ballast so that the system 100 can respond to quick changes in gas demands from the gas consuming device 118.

In one embodiment, the control system 124 determines the liquid reactant pulse rate and/or a corresponding pouch feed rate using one or more mathematical or statistical curves. In a further embodiment, the control system 124 determines the pulse rate using a gas pressure curve and a gas demand curve, each curve having individual slopes and magnitudes. In one embodiment, the magnitudes at varying points along the curves signify an amount of time between pulses. The magnitudes may be positive or negative, with positive values signifying a slower pulse rate, and negative values signifying a faster pulse rate. When the control system 124 uses multiple curves, the control system 124 may add the magnitudes from each curve at the point on the curve corresponding to a current system state together to determine the pulse rate and/or feed rate.

The control system 124, in one embodiment, is configured to control both the solid reactant pouch feed rate and the liquid reactant injection rate based on the algorithm and/or calculations described above. In a further embodiment, the solid reactant pouch load rate and the liquid reactant injection rate are directly proportional to each other. By injecting only a near stoichiometric amount of liquid reactant when gas is required, the unused solid reactant pouches remain dry and can be stored indefinitely.

Figure 2:
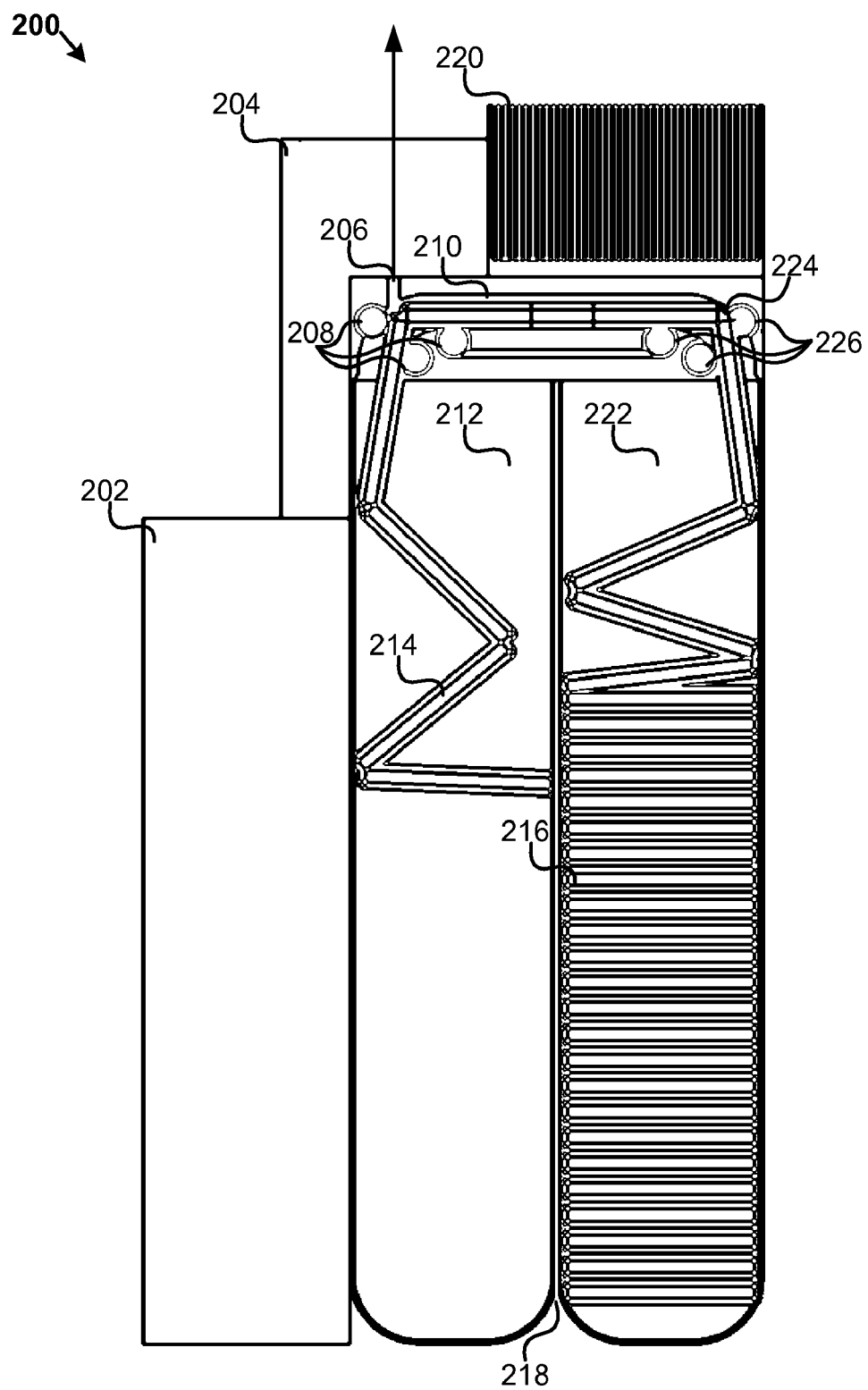
FIG. 2 is a schematic block diagram illustrating another embodiment of a system for generating a gas from solid reactant pouches in accordance with the present invention.

FIG. 2 depicts one embodiment of a system 200 for generating a gas from solid reactant pouches. In one embodiment, the system 200 comprises a liquid reservoir 202, a gas filtration module 204, a gas outlet 206, one or more pouch exit rollers 208, a reaction chamber 210, a used pouch storage 212, one or more used pouches 214, one or more solid reactant pouches 216, an air gap 218, a heat-sink 220, a pouch source 222, a liquid reactant inlet 224, and one or more pouch entrance rollers 226.

In one embodiment, the liquid reservoir 202 is configured to store a liquid reactant such as water, an alcohol, an acid, a base, or the like. The liquid reactant, in a further embodiment, may comprise one or more activating agents. The liquid reservoir 202 is in fluid communication with the liquid reactant inlet 224 such that the liquid reactant from the liquid reservoir 202 may be introduced into the reaction chamber 210.

In one embodiment, the gas filtration module 204 is substantially similar to the gas filtration module 112 of FIG. 1. The gas filtration module 204 is configured to filter contaminants from a generated gas stream exiting the reaction chamber 210 through the gas outlet 206. The gas filtration module 204 may also be configured to remove water and/or other liquids from the generated gas stream and to send the water and/or other liquids to the liquid reservoir 202. To assist in water removal, the gas filtration module 204 may comprise a cooling system that facilitates the condensation of water, and may also cool the reaction chamber 210 and the used pouches 214. The cooling system may comprise the heat-sink 220, or may be an additional cooling system. In one embodiment, the gas filtration module 204 is removable and replaceable.

In one embodiment, the gas outlet 206 is configured to release generated gas from the reaction chamber 210 to the gas filtration module 204. The gas outlet 206 may comprise a seal, such as an O-ring or the like. The seal may substantially circumscribe the gas outlet 206, and may substantially prevent the generated gas from leaking out between the gas filtration module 112 and the reaction chamber 210. In another embodiment, the gas outlet 206 may comprise one or more valves configured to prevent produced gas from reentering the reaction chamber 210, providing for a one way flow of gas through the gas outlet 206. In a further embodiment, one or more valves may prevent produced gas from passing through the gas outlet 206 when the gas filtration module 204 is not attached.

In one embodiment, the one or more pouch exit rollers 208 may be substantially similar to the second pouch feeder 120 of FIG. 1. The one or more pouch exit rollers 208 are configured to move the used solid reactant pouches 214 from the reaction chamber 210 to the used pouch storage 212. In one embodiment, the pouch exit rollers 208 may squeeze liquid from the used solid reactant pouches 214 and send the liquid to the liquid reservoir 202. In another embodiment, the pouch exit rollers 208 comprise a heat conductive material, such as a metal, and are configured to remove heat from the used solid reactant pouches 214, cooling them before they enter the used pouch storage 212. The one or more pouch exit rollers 208 may comprise a rough surface to increase friction between the one or more pouch exit rollers 208 and the used pouches 214.

In one embodiment, the reaction chamber 210 is substantially similar to the reaction chamber 106 of FIG. 1. The reaction chamber 210 is configured to receive the one or more solid reactant pouches 216, to receive a liquid reactant through the liquid reactant inlet 224, to contain a chemical reaction between the liquid reactant and the solid reactant in the one or more solid reactant pouches 216 to generate a gas, to allow the generated gas to exit through the gas outlet 206, and to allow the one or more used pouches 214 to exit. The reaction chamber 210 may comprise a durable material such as aluminum, and may be configured not to react with the solid reactant in the one or more solid reactant pouches 216 by being anodized or the like. In another embodiment, the reaction chamber 210 (and/or the entire system 200) may be coupled to and operated in cooperation with one or more additional reaction chambers (and/or systems).

In one embodiment, the used pouch storage 212 is substantially similar to the used pouch storage 122 of FIG. 1. The used pouch storage 212 is configured to store the one or more used pouches 214. In one embodiment, the used pouch storage 212 may be configured to contain a chemical reaction and to allow generated gas to exit through the gas outlet 206 if an amount of liquid reactant and unreacted solid reactant remains in the one or more used pouches 214 as they enter the used pouch storage 212. In a further embodiment, the one or more used pouches 214 comprise substantially no unreacted solid reactant and substantially no liquid reactant. In another embodiment, the used pouch storage 212 may be configured to dissipate heat from the one or more used pouches 214 and/or from the reaction chamber 210.

In one embodiment, the one or more solid reactant pouches 216 may be substantially similar to the solid reactant pouches discussed above with regard to FIG. 1, and are discussed in greater detail below with regard to FIG. 3A and FIG. 3B. The one or more solid reactant pouches 216 comprise liquid permeable pouches, each pouch comprising an anhydrous solid chemical reactant and, in one embodiment, an anhydrous solid activating agent. The one or more solid reactant pouches 216 are configured for loading into the reaction chamber 210 by the one or more pouch entrance rollers 226.

As described above, each of the solid reactant pouches may completely enclose one or more cavities filled with solid reactant or may partially enclose the one or more cavities. The one or more solid reactant pouches 216 may comprise textile, fabric, paper, polymer, synthetic, composite, and/or other materials, at least a portion of which is liquid permeable. The one or more solid reactant pouches 216 may be sewn, bonded, machined, molded, cast, or otherwise formed to define the one or more cavities that hold the solid reactant.

The one or more solid reactant pouches 215 may comprise one or more alignment structures to facilitate the feeding of the solid reactant pouches 215 through the system 200. In the depicted embodiment, the one or more solid reactant pouches 216 are foldably coupled to each other to facilitate the smooth, ordered feeding of the one or more solid reactant pouches 216 into the reaction chamber 210. In an alternative embodiment, the one or more solid reactant pouches 216 are not coupled to each other, and are fed individually into the reaction chamber 210 by the one or more pouch entrance rollers 226. In another embodiment, the one or more solid reactant pouches 216 comprise a protective coating, container, packaging or the like.

In one embodiment, the air gap 218 is disposed between the used pouch storage 212 and the pouch source 222 to facilitate cooling of the used pouch storage 212, the pouch source 222, and the reaction chamber 210. In one embodiment, the heat-sink 220 is substantially similar to the cooling system 114 of FIG. 1. The heat-sink 220, in a further embodiment, is coupled directly to the reaction chamber 210 such that the heat-sink 220 conducts heat out of the reaction chamber 210. In another embodiment, the heat-sink 220 comprises one or more fans or blowers to further disperse heat.

In one embodiment, the pouch source 222 is substantially similar to the pouch source 102 of FIG. 1. The pouch source 222 is configured to store the one or more solid reactant pouches 216. The pouch source 222, in one embodiment, substantially protects the one or more solid reactant pouches 216 from exterior contaminants and influences such that the one or more solid reactant pouches 216 may be stored indefinitely for on-demand use.

In one embodiment, the liquid reactant inlet 224 injects liquid reactant from the liquid reservoir 202 into the reaction chamber 210. The liquid reactant inlet 224 and the liquid reservoir 202, in one embodiment, are substantially similar to the liquid injection system 108 of FIG. 1. The liquid reactant inlet 224 may inject the liquid reactant directly into or onto the one or more solid reactant pouches 216 as they enter the reaction chamber 210. In another embodiment, the liquid reactant inlet 224 may introduce an amount of liquid reactant into the reaction chamber 210 such that the pouch entrance rollers 226 introduce the solid reactant pouches 216 into an existing amount of liquid reactant as they enter the reaction chamber 210. The liquid reactant inlet 224 may comprise one or more tubes, needles, inlets, ports, manifolds, passages, and the like. In a further embodiment, the liquid reactant inlet 224 may be integrated with the one or more pouch entrance rollers 226. In another embodiment, a pump or the like provides the liquid reactant to the liquid reactant inlet 224 from the liquid reservoir 202.

In one embodiment, the one or more pouch entrance rollers 226 feed the one or more solid reactant pouches 216 from the pouch source 222 into the reaction chamber 210. The one or more pouch entrance rollers 226 may be substantially similar to the first pouch feeder 104 of FIG. 1. The one or more pouch entrance rollers 226 may comprise a rough surface to increase friction between the one or more pouch entrance rollers 226 and the solid reactant pouches 216. In one embodiment, at least one of the one or more pouch entrance rollers 226 comprises one or more protrusions configured to puncture a protective coating of the one or more solid reactant pouches 216 as they are fed into the reaction chamber 210. The one or more protrusions may be integrated with the liquid reactant inlet 224, delivering liquid reactant directly into or onto the one or more solid reactant pouches 216 as they puncture the protective coating.

Figure 3A:
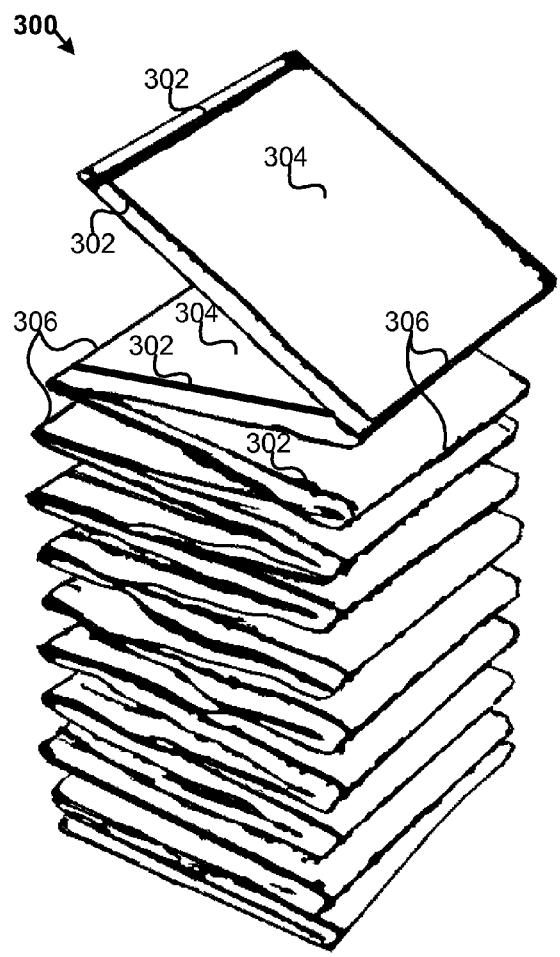
FIG. 3A is a drawing illustrating one embodiment of solid reactant pouches in accordance with the present invention.
Figure 3B:
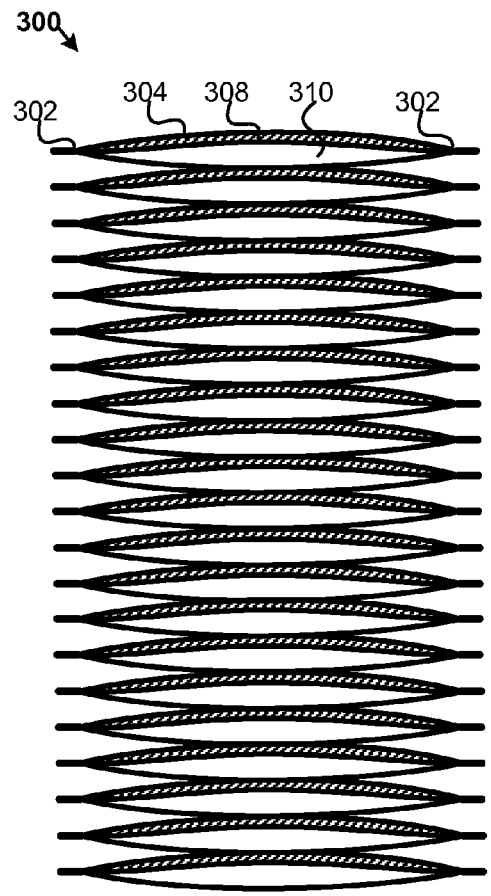
FIG. 3B is a cross-sectional side view illustrating another embodiment of solid reactant pouches in accordance with the present invention.

FIGS. 3A and 3B depict two embodiments of solid reactant pouches 300. In the embodiment depicted in FIG. 3A, the solid reactant pouches 300 comprise are foldably coupled in series, and comprise one or more seams 302, one or more pouch cavities 304, and one or more folds 306. In the embodiment, depicted in the cross-sectional side view of FIG. 3B, the solid reactant pouches 300 are separate and individually stacked, and comprise one or more seams 302, one or more pouch cavities 304, a heat diffusion layer 308, and a solid anhydrous reactant 310.

In one embodiment, the solid reactant pouches 300 are constructed, at least partially, of a liquid permeable material, or fabric. As used herein, "fabric" includes not only textile materials, but also includes textile, paper, composite, synthetic, polymer, and other materials. In one embodiment, at least a portion of the material that forms the solid reactant pouches 300 is a porous, liquid permeable material. One embodiment of a fabric suitable for use in at least a portion of the solid reactant pouches, is a porous material which can maintain structural integrity at temperatures ranging from about −20° C. to about 200° C., and a pH ranging from about 4 to about 14. As described above, the one or more solid reactant pouches 300 may be sewn, bonded, machined, molded, cast, or otherwise formed to define the one or more pouch cavities 304 that hold the solid reactant 310.

Suitable fabrics may include but are not limited to woven or nonwoven Nylon, Rayon, polyester, porous filter paper, or blends of these or other materials. In one embodiment, the material for the solid reactant pouches 300 may be selected for optimal thickness, density, and water retention. In one embodiment, the solid reactant pouches 300 comprise a material with minimal water retention, such that the weight of the water retained is less than about 10 times the weight of the material itself. The material may also include little or no wicking capabilities. In a further embodiment, a material is selected with greater water retention ability and some wicking ability.

The water retention and wicking potential of the solid reactant pouches 300 affect where the chemical reaction between the liquid reactant and the solid reactant occurs. Low water retention and wicking potential helps keep the chemical reaction at or near the point of liquid reactant injection. If the water retention and wicking potential are higher, the solid reactant pouches 300 wick and retain the liquid reactant such that the chemical reaction can occur further from the point of liquid reactant injection. Selection of a material for the solid reactant pouches 300 may be based on the configuration of the reaction chamber, the liquid reactant inlet, and the solid reactant and activating agent in use, in order to more precisely control the chemical reaction within the reaction chamber.

Other relevant factors may include water permeability, porosity, chemical reactivity, and temperature stability between about 150° C. and about 250° C. relative to the solid reactant, activating agent, and the liquid injection system in use. One possible thickness for the material for the solid reactant pouches 300 is between about 0.002 inches and 0.01 inches. A suitable density may be less than about 0.05 grams per square inch.

In one embodiment, the solid reactant pouches 300 may have a thickness of about 0.0043 inches, a density of about 57.9 grams per square meter, are water permeable, have a pore size below about 0.0025 inches, are chemically resistant in basic and acidic solutions of about pH 4 to about pH 13, are stable in temperatures up to about 180° C., and retain only about 4 times their own weight in water. Other combinations of material properties such as thickness, density, and water retention that are configured for stable gas generation may also be used.

In one embodiment, the solid reactant pouches 300 are comparatively thin, each pouch having a substantially greater area than thickness. The solid reactant pouches 300 may be formed in any conventional manner. For example, as depicted in FIG. 3A, it can be seen how two long rectangular sheets of fabric material may be sealed along three edges (for example by the seams 302 or other sealing methods) and segmented into individual pouches, each having a pouch cavity 304 (also defined by the seams 302 and/or the folds 306). Before the final seam 302 down the length of the solid reactant pouches 300 is closed, the series of pouch cavities 304 thus formed may be filled with a fine grain solid reactant 310, as described below, and sealed along the fourth edge closing (such as by stiching) the final seam 302 down the length of the solid reactant pouches 300, leaving the solid reactant pouches 300 coupled to each other in series. Alternatively, each of the solid reactant pouches 300 may be formed separately, or formed together and separated, as depicted in FIG. 3B.

An illustrative thickness in one embodiment of each of the individual solid reactant pouches 300 when unfolded and charged with a solid reactant 310 may be approximately ¼ of an inch in one embodiment and its dimensions could be approximately 3 inches by 3 inches square. The thickness of the pouch 302 and the dimensions may be determined based on the size of the reaction chamber, and the configuration of the pouch feeders. In one embodiment, a liner (not shown) is also disposed within the housing 300 to protect the housing 300 from corrosion and damage. The liner may be removable or permanent, and may serve to extend the life of the housing 300. In one embodiment, the liner is a bag or pouch consisting of a plastic or other inert material known in the art, and the liner is configured to withstand the temperatures associated with a gas generating chemical reaction, and to protect the cartridge 300 from corrosion.

In one embodiment, the one or more seams 302 comprise conventional hand or machine stitching. In another embodiment, the one or more seams 302 comprise glued seams, heat welds, staples, or other fabric fastening mechanisms. In one embodiment, the one or more pouch cavities 304 are defined by the one or more seams 302 and/or the one or more folds 306. Each of the pouch cavities 304, in one embodiment, comprises an anhydrous solid chemical reactant 310 mixed with or disposed alongside an anhydrous solid activating agent. As described above, examples of solid reactants suitable for use as the solid reactant 310 include, but are not limited to, chemical hydrides, metals or metal derivatives, chlorate compounds, perchlorate compounds, superoxide compounds, ozonide compounds, ammonia-containing compounds, and the like. Examples of chemical hydrides include, but are not limited to, sodium borohydride, lithium borohydride, lithium aluminum hydride, lithium hydride, sodium hydride, potassium borohydride, and calcium hydride. Other examples include high hydrogen density chemical hydrides such as ammonia borane, and diboranoamides. Other examples of the solid reactant 310 are described above with regard to FIG. 1.

In one embodiment, the solid reactant 310 comprises a powder having a grain size ranging from about mesh 10 to about mesh 1000. In another embodiment, the solid reactant 310 comprises a powder that is compressed to form a wafer-like structure. In one embodiment, the activating agent is an anhydrous, powdered solid when mixed with the solid reactant 310, since solids tend to react very slowly with each other. However, in alternative embodiments, the activating agent may also be mixed into an organic/oil solvent. In addition, the activating agent in certain embodiments is water soluble, increasing its potential to activate the liquid reactant and solid reactant 310 reaction. In one embodiment, the volumetric packing density of the solid reactant and activating agent mixture 310 varies between about 0.3 g/cm$^3$ to about 2.5 g/cm$^3$.

Example activating agents include salts of Group IIA (alkaline earth metals), or Group IIIA with Group VIIA (halides), such as $MgCl_2$ $AlCl_3$, $BeF_2$, $BeCl_2$, $BeBr_2$, $BeI_2$, $MgF_2$, $MgBr_2$, $Mg_2I$, $CaF_2$, $CaCl_2$, $CaBr_2$, and $CaI_2$. The fluorides and chlorides may be useful as activating agents because they have a lower molecular weight. Some of these salts may be less useful as an activating agent depending on their degree of solubility in water and their degree of toxicity (e.g., beryllium compounds).

Example activating agents may also include other water soluble salts such as Group IA (alkali metals) salts including LiF, LiCl, LiBr, LiI, NaF, NaCl, NaBr, NaI, KF, KCl, KBr, and KI. Group IA and Group IIA hydroxides may be less useful as activating agents, because they make basic solutions in water and thus reduce the reaction rate. Group IA and Group IIA oxides may also be less useful as activating agents because they tend to be more stable and thus not as reactive. However, Group IA and Group IIA sulfides, sulfates, and selenides, such as $Li_2S$, $Li_2Se$, $Mg(SO_4)_2$ may be better activating agents if they are sufficiently water soluble. In one embodiment, the activating agents are chosen from the group of $MgCl_2$, $BeCl_2$, LiCl, NaCl, or KCl. However, any of the above activating agents may be employed given the proper design and use conditions. In certain embodiments, the activating agent will have a grain size ranging from about mesh 10 to about mesh 1000. In one embodiment, the quantity of activating agent mixed with the solid reactant is from about 10 weight percent to about 65 weight percent.

Other example activating agents may be an anhydrous or powdered acid such as boric acid ($H_3BO_3$), oxalic acid, tartaric acid, citric acid, etc. Such anhydrous acids can be mixed with the solid reactant without reaction, but when water is added, the anhydrous acid dissolves and thus causes a reaction. Weak or relatively insoluble anhydrous acids such as boric acid, when mixed with a solid reactant, produce a gas in the presence of a liquid reactant at a relatively low rate, and thus are less useful. Strong acids such as oxalic acid are very soluble in water and generate substantial gas when mixed with a solid reactant. However, this mixture may be difficult to control and thus less useful. However, intermediate strength acids, such as tartaric acid or citric acid are more useful. In one embodiment, the strength (Ka) of the dry acid will range from about $1\times10^{-4}$ to about $1\times10^{-11}$. In certain embodiments, the powdered acid will have a grain size ranging from about mesh 10 to about mesh 1000. In one embodiment, the quantity of tartaric acid mixed with the solid reactant is from about 5 to about 50 weight percent. In another embodiment, the quantity of tartaric acid may be between about 8 to about 12 weight percent.

As a further alternative embodiment, an inexpensive, water-insoluble catalyst may be mixed with the solid reactant. The catalyst can act to accelerate the liquid reactant and solid reactant reaction as the liquid reactant is injected. Such metal catalyst could include Co, Ni, Cu, Pt, Pd, Fe, Ru, Mn, and Cr. In one embodiment, the metal catalyst will be in a powder form (e.g., particles less than 25 um) and will be added to the solid reactant in an amount of about 25 weight percent to about 65 weight percent.

A still further alternative embodiment to mixing an anhydrous activating agent with the solid reactant 310 may be to mix the water soluble activating agent in with the liquid reactant before it is injected onto or into the solid reactant pouches 300. This has the advantage that an aqueous substance such as hydrochloric acid (HCl) may be used as the liquid reactant described above. In this embodiment, the activating material is held in a separate container or liquid reservoir. In a further embodiment, a liquid soluble reactant may be mixed with a liquid to form the liquid reactant In one embodiment, as depicted in FIG. 3A, the one or more folds 306 arrange the solid reactant pouches 300 in a zigzag configuration or stack suitable for compact storage in a pouch source such as the pouch source 102 of FIG. 1 or the pouch source 222 of FIG. 2. Alternatively, in another embodiment, as depicted in FIG. 3B, the solid reactant pouches 300 may not be coupled, but may comprise a stack of separate solid reactant pouches 300 to be stored in a pouch source. In a further embodiment, each of the folds 306 comprises a seam 302 and/or a heat weld or the like that is configured to limit the amount of liquid reactant that wicks between the solid reactant pouches 300.

In one embodiment, as depicted in FIG. 3B, the solid reactant pouches 300 comprise the heat diffusion layer 308. The heat diffusion layer 308, in one embodiment, may comprise a portion of, or wall of, the solid reactant pouches 308 that is heat conductive. In other embodiments, the heat diffusion layer 308 may comprise a separate sheet or layer disposed within the solid reactant pouches 300, a powder disposed within the solid reactant pouches 300 that is disposed adjacent to the solid reactant 310, or another type of heat diffusion layer that removes heat from the solid reactant 310. Examples of heat conductive materials include metals, graphite materials, certain polymers and ceramics, and other materials capable of conducting heat away from the solid reactant 310. Certain types of solid reactants 310 may be subject to thermal decomposition, and the heat diffusion layer 308 may diffuse enough heat to limit the decomposition.

The heat diffusion layer 308 may comprise a liquid permeable material, and/or may be disposed such that the heat diffusion layer 308 does not interfere with the reaction between the liquid reactant and the solid reactant 310. For example, the heat diffusion layer 308 may be disposed toward one side of the solid reactant pouches 300 and the liquid reactant delivered to an opposite side, or the heat diffusion layer 308 may be disposed toward the center of the solid reactant pouches 300, and the liquid reactant delivered to both sides of the solid reactant pouches 300.

In one embodiment, an alignment mechanism (not shown) such as a tab or the like is affixed to one end of the solid reactant pouches 300. The alignment mechanism may be an extension of the fabric used to construct the solid reactant pouches 300, or may be another material or fabric fixedly attached to one end of the solid reactant pouches 300. The alignment mechanism, in one embodiment, is configured to allow a pouch feeder, such as the first pouch feeder 104 of FIG. 1 or the pouch entrance rollers 226 of FIG. 2, to load the solid reactant pouches 300 upon their first use.

In the embodiment depicted in FIG. 3A, an alignment mechanism such as a tab may be affixed to a single solid reactant pouch in the series of coupled solid reactant pouches 300. Alternatively, the alignment mechanism may comprise a hole, clip, rivet, or the like. In the embodiment depicted in FIG. 3B, separate alignment mechanisms may be affixed to each of the solid reactant pouches 300 in the stack. As described above with regard to the first pouch feeder 104 of FIG. 1, in one embodiment, a pouch feeder may be configured to load one or more of the solid reactant pouches 300 without the use of an alignment mechanism.

In one embodiment, the solid reactant pouches 300 are covered in a protective coating. The protective coating, in a further embodiment, may be waterproof and may protect the solid reactant pouches 300 from contaminants and further protect users from harmful contact with the contents of the solid reactant pouches 300. The protective coating may further protect the solid reactant pouches 300 from contact with each other. Examples of protective coatings include water impermeable high temperature thin film plastics such as Mylar™, other polyesters, or other thin film flexible plastics. The solid reactant pouches 300, in another embodiment, may be placed in a container or packaging. The container or packaging may also protect the solid reactant pouches 300 from contaminants and protect the user. The container or packaging may be configured to be placed within a pouch source such as the pouch source 102 of FIG. 1 or the pouch source 222 of FIG. 2, and to remain in the pouch source while the solid reactant pouches 300 are removed from the pouch source. A protective covering, container, or packaging may also ease shipping and distribution of the solid reactant pouches 300.

Figure 4:
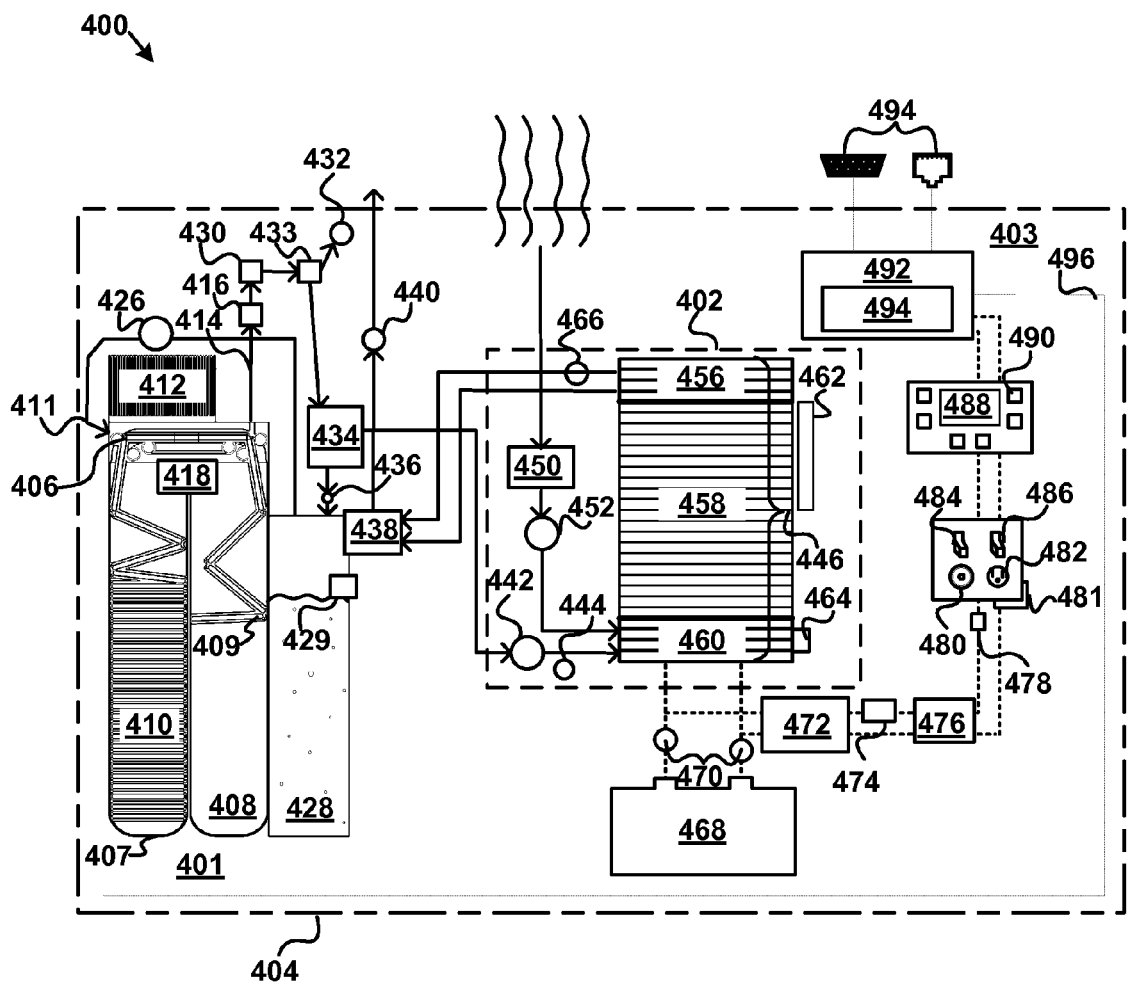
FIG. 4 is a schematic block diagram illustrating one embodiment of a system for generating electricity from a feed of hydride pouches in accordance with the present invention.

FIG. 4 depicts one embodiment of a system 400 for generating electricity from a feed of hydride pouches. The system 400 includes a hydrogen generation system 401, a hydrogen consuming device 402, an electrical and control system 403, and an outer housing 404.

In one embodiment, the hydrogen generation system 401 is substantially similar to the system 100 of FIG. 1 and/or the system 200 of FIG. 2. In one embodiment, the hydrogen generation system 401 comprises a pouch source 407, a used pouch storage 408, one or more used pouches 409, one or more hydride pouches 410, a liquid reactant inlet 411, a cooling system 412, a hydrogen outlet 414, a hydrogen filtration module 416, one or more sensors 418, a pump 426, a liquid reservoir 428, a level sensor 429, a check valve 430, a hydrogen pressure sensor 432, one or more mechanical valves 433, a water trap 434, a transfer valve 436, a condenser 438, and an air pressure control valve 440. In general, the hydrogen generation system 401 generates hydrogen using a liquid reactant such as water, and a feed of hydride pouches 410 comprising a chemical hydride and an activating agent.

In one embodiment, the pouch source 407, the used pouch storage 408, the one or more used pouches 409, the one or more hydride pouches 410, the liquid reactant inlet 411, the cooling system 412, the hydrogen outlet 414, the hydrogen filtration module 416, the one or more sensors 418, the pump 426, and the liquid reservoir 428 are substantially similar to the pouch source 102, the used pouch storage 122, the one or more used pouches, the one or more solid reactant pouches, the liquid reactant inlet of the liquid injection system 108, the cooling system 114, the hydrogen outlet, the gas filtration module 112, the one or more sensors 110, the pump of the liquid injection system 108, and the liquid reservoir of the liquid injection system 108 of FIG. 1. In another embodiment, they are substantially similar to the pouch source 222, the used pouch storage 212, the one or more used pouches 214, the one or more solid reactant pouches 216, the liquid reactant inlet 224, the heat-sink 220, the hydrogen outlet 206, the gas filtration module 204, the one or more sensors (not shown), the pump (not shown), and the liquid reservoir 202 of FIG. 2.

In one embodiment, the liquid level detector 429 monitors a liquid reactant or water level of the liquid reservoir 428. The liquid level detector 429 may be an ultrasonic sensor, a float sensor, a magnetic sensor, a pneumatic sensor, a conductive sensor, a capacitance sensor, a point level sensor, a laser sensor, an optical sensor, or another liquid level sensor. In a further embodiment, the liquid level detector 429 comprises a window into the liquid reservoir 428 that allows a user to visually monitor the liquid reactant level.

In one embodiment, generated hydrogen passes through the check valve 430. The check valve 430 allows hydrogen to exit the reaction chamber 411, but prevents hydrogen from returning into the reaction chamber 411. The check valve 430 also prevents hydrogen from exiting the system 400 when the reaction chamber 411 has been removed. This conserves hydrogen, provides a safety check for the user, and allows an amount of hydrogen to be stored in the system 400 for later use. The check valve 430 is in inline fluid communication with the hydrogen outlet 414. In one embodiment, a second check valve is integrated into the reaction chamber 411. The check valve 430 may be a silicone duckbill type valve, or a diaphragm type valve supplied by United States Plastics of Lima, Ohio.

In one embodiment, the hydrogen pressure sensor 432 is downstream from the check valve 430, and measures the gas pressure of the hydrogen. In a further embodiment, the hydrogen pressure sensor 432 measures the hydrogen pressure in the system upstream of a hydrogen regulator 442. The hydrogen pressure sensor 432 may be used for safety purposes and/or to monitor hydrogen generation rates. In one embodiment, a controller 492 of the electrical and control system 403 may use the pressure values measured by the hydrogen pressure sensor 432 to determine a pump pulse rate for the pump 426 using a pressure curve, as described above. In general, the controller 492 may increase the pulse rate for low pressure measurements, and decrease the pulse rate for high pressure measurements. More curves, such as power demand or other curves, may also be factored into determining an optimal pulse rate. Monitoring the pressure using the pressure sensor 432 also allows the system 400 to adjust the pressure before it reaches unsafe levels. If pressure is above a predetermined safety value, the electrical and control system 403 may vent hydrogen out or to a surge bladder through a hydrogen purge valve 466 to return the system to a safe pressure.

In one embodiment, the mechanical valve 433 is positioned upstream of the hydrogen pressure regulator 442. In one embodiment, the mechanical valve 433 is a mechanical valve configured to automatically release gas pressure when the pressure is greater than a predetermined pressure. In one embodiment, the predetermined pressure associated with the mechanical valve 433 is higher than the predetermined safety value associated with the hydrogen pressure sensor 432 described above. In one embodiment, the predetermined pressure associated with the mechanical valve 433 is about 24 pounds per square inch gauged (psig), and the predetermined safety value associated with the hydrogen pressure sensor 432 is between about 25 to 30 psig or higher depending on system design requirements, such as 100 psig.

In one embodiment, one or more other system components are configured to release hydrogen pressure in the event that the hydrogen pressure regulator 442 fails. The other system components may include O-rings, hose fittings or joints, the pump 426, or other mechanical components or connections. The multiple levels of pressure release provide added safety to the user, and ensure that the system 400 remains at a safe pressure, with no danger of explosions or other damage to the system 400 or to the user. Low pressure systems are not only safer than higher pressure systems, but in general they have lower material and construction costs.

In one embodiment, the hydrogen passes through the water trap 434. The water trap 434 is configured to remove moisture from the hydrogen gas. In a further embodiment, the water trap 434 also comprises one or more particulate filters configured to filter particles from the hydrogen gas. The particulate filters may be substantially similar to the particulate filter described above. Filtering the hydrogen reduces corrosion, wear, and other damage that may be done to the fuel cell stack 458, and extends the life of the system 400. In one embodiment, the moisture removed from the water trap 434 passes through transfer valve 436 to the liquid reservoir 428. The recycled water can then be injected into the reaction chamber 411 as described above.

In one embodiment, the liquid reservoir 428 has a condenser 438. The condenser 438 removes water from air and other gasses that enter the liquid reservoir 428. In one embodiment, water condenses on frit or other material in the condenser. In a further embodiment, the air and other gasses exit the system through the pressure control valve 440 after passing through the condenser 438. In one embodiment, the water trap 434 and the condenser 438 are substantially similar to the liquid recovery system 116 of FIG. 1.

In one embodiment, the hydrogen passes from the water trap 434 to a hydrogen consuming device 402, such as a hydrogen fuel cell system. In further embodiments, the hydrogen consuming device 402 may comprise a micro-turbine system or other hydrogen combustion system, a hydrogen storage tank, or another device that consumes, stores, or otherwise uses hydrogen. In one embodiment the hydrogen consuming device 402 may comprise a hydrogen pressure regulator 442, a hydrogen pressure sensor 444, a hydrogen fuel cell stack assembly 446, one or more air filters 450, one or more air pumps 452, an air humidifier 456, a modular stack 458, a hydrogen humidifier 460, one or more cooling fans 462, a temperature sensor 464, a hydrogen purge valve 466, and one or more power storage devices 468.

In one embodiment, the hydrogen regulator 442 regulates the flow of hydrogen into the hydrogen fuel cell stack assembly 446 from the water trap 434. The hydrogen regulator 442 may cooperate with the check valve 430 to store hydrogen between the check valve 430 and the hydrogen regulator 442, even between uses of the system 400. The hydrogen regulator 442 releases a controlled amount of hydrogen into the fuel cell stack assembly 446, maintaining a predetermined gas pressure in the fuel cell 446. In one embodiment, the predetermined gas pressure in the fuel cell 446 is about 7 psi. In a further embodiment, the system 400 may comprise one or more hydrogen output regulators to control the amount of hydrogen gas that the hydrogen generation system 401 releases. The one or more hydrogen output regulators may comprise the check valve 430, the hydrogen regulator 442, and/or the controller 492, as described above.

In one embodiment, the hydrogen pressure sensor 444 measures the gas pressure of the hydrogen in the system 400 downstream of the hydrogen regulator 442. (i.e. within the hydrogen consuming device 402). The hydrogen pressure sensor 444 may be used for safety purposes, and/or to monitor hydrogen use by the fuel cell 446. If pressure is above a predetermined safety value, hydrogen may be vented from the system through the hydrogen purge valve 466 to return the pressure to a safe level. In one embodiment, if the pressure is below the predetermined fuel cell gas pressure described above, the hydrogen regulator 442 releases more hydrogen into the fuel cell stack 446.

The hydrogen fuel cell stack assembly 446 creates electric power from a flow of hydrogen and an oxygen source such as air, as is known in the art. In general, each fuel cell 458 in the hydrogen fuel cell stack assembly 446 has a proton exchange membrane (PEM), an anode, a cathode, and a catalyst. A micro-layer of the catalyst is usually coated onto carbon paper, cloth, or another gas diffusion layer, and positioned adjacent to the PEM, on both sides. The anode, the negative post of the fuel cell 458, is positioned to one side of the catalyst and PEM, and the cathode, the positive post of the fuel cell, is positioned to the other side. The hydrogen is pumped through channels in the anode, and oxygen, usually in the form of ambient air, is pumped through channels in the cathode. The catalyst facilitates a reaction causing the hydrogen gas to split into two H+ions and two electrons. The electrons are conducted through the anode to the external circuit, and back from the external circuit to the cathode. The catalyst also facilitates a reaction causing the oxygen molecules in the air to split into two oxygen ions, each having a negative charge. This negative charge draws the H+ions through the PEM, where two H+ions bond with an oxygen ion and two electrons to form a water molecule.

In one embodiment, one or more air filters 450 are configured to filter air for use by the fuel cell stack assembly 446. In one embodiment, one or more air pumps 452 draw air into the system 400 through the air filters 450. The air pumps 452 may be diaphragm pumps, or other types of air pumps capable of maintaining an air pressure to match the hydrogen pressure in the fuel cell, for a maximum power density in the fuel cell stack 446. In one embodiment, the air pumps 452 are configured to increase or decrease the air flow in response to a signal from the electrical and control system 403. The electrical and control system 403 may send the activating signal in response to a determined electrical load on the system 400.

Varying the air flow as a function of the electrical load reduces parasitic power losses and improves system performance at power levels below the maximum. In one embodiment, the one or more air pumps 452 have multiple air pumping capabilities configured to optimize the amount of air delivered to the fuel cell stack 446. For example, a smaller capacity air pump 452 may be activated during a low power demand state, a larger capacity air pump 452 may be activated during a medium power demand state, and both the smaller and the larger capacity air pumps 452 may be activated during a high power demand state. In another example, a single air pump 452 may provide a variable air flow.

In one embodiment, the air humidifier 456 humidifies the air entering the fuel cell stack 446. Adding moisture to the air keeps the PEMs in each of the fuel cells 458 moist. Partially dehydrated PEMs decrease the power density of the fuel cell stack 446. Moisture decreases the resistance for the H+ions passing through the PEM, increasing the power density. In one embodiment, moist air exiting the fuel cell stack 446 flows past one side of a membrane within the air humidifier 456 before exiting the fuel cell stack 446, while dry air flows past the other side of the membrane as the dry air enters the fuel cell stack 446. Water is selectively drawn through the membrane from the wet side to the dry side, humidifying the air before it enters the fuel cell stack 458.

In one embodiment, the hydrogen humidifier 460 is configured to humidify the hydrogen entering the fuel cell stack 446, such that the PEM remains moist. This is useful if the fuel cell stack 446 is being run at a very high power density, or at a very high temperature, and the moisture already in the hydrogen is not enough to keep the PEM moist. The hydrogen humidifier 460 may be configured in a similar manner as the air humidifier 456, with hydrogen flowing into the fuel cell stack 446 on one side of a membrane within the hydrogen humidifier 460, and moist air flowing out of the fuel cell stack 446 on the other side of the membrane, the membrane selectively allowing water to pass through to humidify the hydrogen. The moist hydrogen will moisten the anode side of the PEMs, while the moist air from the air humidifier 456 will moisten the cathode side of the PEMs.

In a further embodiment, the air humidifier 456 and the hydrogen humidifier 460 may be integrated with each other and/or with the fuel cell stack 458. The air humidifier 456 and the hydrogen humidifier 460 may each comprise an input gas chamber and a water vapor chamber, with a water-selective membrane disposed between them. The air humidifier 456 and the hydrogen humidifier 460 may be integrated with structural members of the fuel cell stack assembly 446, and may be configured to have an area footprint less than or equal to the area footprint of one or more of the fuel cells in the fuel cell stack 458.

In one embodiment, the one or more cooling fans 462 prevent the fuel cell stack 458 from overheating. The electrical and control system 403 controls the operation and speed of the cooling fans 462. Separating the cooling system 462 from the fuel cell stack air supply system decreases the dehydration of the PEM since the air supply can be kept at a much lower flow than is required for cooling. A fuel cell system with separated cooling and air supply systems is referred to as closed cathode system. In one embodiment, the cooling fans 462 are low power fans that provide high airflows. In a further embodiment, the airflow from the cooling fans 462 may be adjusted according to the temperature of the fuel cell stack 458 to reduce parasitic power losses. In another embodiment, the one or more cooling fans 462 comprise one or more blowers configured to maintain a higher air pressure than an axial fan. One or more forms, guides, ducts, baffles, manifolds, or heat dams may be used to control and direct the flow of air, or to maintain a predefined air pressure in and around the fuel cell stack 446.

In one embodiment, the temperature sensor 464 measures the temperature of the fuel cell stack 462. As described above, in one embodiment the cooling fans 462 may be activated based, at least in part, on the temperature that the temperature sensor 464 measures. In a further embodiment, the electrical and control system 403 is configured to shutdown the system 400 and to notify the user if the temperature sensor 464 measures a temperature higher than a predetermined unsafe temperature value.

In one embodiment, a hydrogen purge valve 466 is coupled to the fuel cell stack 446. The hydrogen purge valve 466 vents hydrogen from the fuel cell stack 446. The hydrogen purge valve 466 may be used to vent hydrogen when pressures reach unsafe levels, as measured by the hydrogen pressure sensors 432, 444 described above, or routinely to keep the fuel cells 458 in good condition by removing accumulated liquid water and impurities from the fuel cell stack 458, improving performance, and preventing corrosion of the catalyst over time. The electrical and control system 403 may send a purge signal to the hydrogen purge valve 466 when the pressure reaches an unsafe level, or when the electrical power produced by the fuel cell stack 446 is below a predefined level. In one embodiment, the hydrogen exiting the fuel cell stack 458 through the hydrogen purge valve 466 and the moist air that has exited the fuel cell stack 458 are sent to the liquid reservoir 428 and passed through the condenser 438 to recycle the water formed in the reaction in the fuel cell stack 446 for reuse.

In one embodiment, one or more power storage devices 468 are coupled electrically to the fuel cell stack 446. In one embodiment, the power storage devices 468 are rechargeable, and are trickle-charged by the fuel cell stack 446 when it is not in use or after the load has been disconnected to use up excess hydrogen produced by the system 400 during shutdown. The power storage devices 468 provide instantaneous power to the load during a startup phase for the system 400. This means that a load connected to the system 400 will have instantaneous power, and will not have to wait for the hydrogen generation system 401 to begin generating hydrogen, or for the fuel cell stack 446 to begin producing electricity before receiving power.

In one embodiment, the power storage devices 468 are configured to heat the fuel cell stack 446 in cold environments to allow rapid startup of the fuel cell stack 446. The power storage devices 468 may heat the fuel cell stack 446 using a heating coil or other heated wire, or by using another electric heating method. In one embodiment, the power storage device 468 is coupled to the fuel cell stack 446 in parallel, and acts to level the load on the fuel cell stack 446 so that the fuel cell stack 446 can operate at its most efficient power level without constantly varying its output based on the load. The power storage devices 468 will supplement the power generated by the fuel cell stack 446 during a spike in the electrical power drawn by the load.

The power storage devices 468 may be selected from a group consisting of batteries, such as sealed lead acid batteries, lithium ion (Li-ion) batteries, nickel metal hydride (NiMH) batteries, or a variety of rechargeable batteries, a capacitor, a super capacitor, and other devices capable of storing electric power. In one embodiment, power storage devices 468 are selected for use with power capacities that may be larger than are necessary to supplement the fuel cell stack 446 in order to avoid deep cycling of the power storage devices 468 and to increase the life of the power storage devices 468. In one embodiment, the power storage devices 468 comprise a capacitor coupled directly to the fuel cell stack 446 in a parallel configuration, and a battery or other power storage device coupled indirectly to the fuel cell stack 446 in parallel after a direct current (DC) to DC converter 472 or other electrical device.

In one embodiment, the electrical and control system 403 is coupled for electrical power and control signal communication with the sensors, valves, and other components of the system 400. In one embodiment, the electrical and control system 403 includes one or more voltage and current sensors 470, a DC to DC converter 472, a circuit breaker 474, a ground fault circuit interrupter (GFCI) device 476, an electronic switch 478, a DC outlet 480, an alternating current (AC) inverter 481, an AC outlet 482, a circuit breaker switch 484, a GFCI switch 486, a display 488, a keypad 490, a controller 492, a computer communication interface 494, and a control bus 496.

In one embodiment, the voltage and current sensors 470 are configured to measure one or more of the voltages and the currents at both poles of the power storage device 468. The electrical and control system 403 may use the measured voltages and currents to determine the charge level of the power storage device 468. Based on the measurements of the voltage and current sensors 470, the electrical and control system 403 may determine whether to charge the power storage device 468 or draw on the power storage device 468 to supplement or proxy for the fuel cell stack 446. In one embodiment, the electrical and control system 403 also provides the power status of the battery to the user.

In one embodiment, the DC to DC converter 472 is configured to convert the variable voltage of the fuel cell stack 446 circuit to a substantially constant voltage. In one embodiment, the substantially constant voltage is a standard voltage, such as 5 Volts, 9 Volts, 12 Volts, 14 Volts, 24 Volts and the like. In one embodiment, the DC to DC converter 432 is a switching converter, such as a buck, boost, buck-boost, inverting, forward, flyback, push-pull, half bridge, full bridge, Cuk, or SEPIC DC to DC converter. In a further embodiment, the DC to DC converter 432 comprises a voltage regulator. In general, use of a switching DC to DC converter results in less power loss than a voltage regulator DC to DC converter. The DC to DC converter 472 may provide electric power to the electrical components of the system 400 and to an electric load that is coupled to the system 400.

In one embodiment, the circuit breaker 474 interrupts the electric circuit in response to an electrical overload or an electrical short in the circuit. An overload in the circuit may occur if the electric load requires more current than the system 400 can provide. In one embodiment, the rating of the circuit breaker 474 is determined by the electric power generating capabilities of the system 400. In one embodiment, the circuit breaker 474 is a standard rated circuit breaker rated for the current level of the electrical and control system 403.

In one embodiment, the circuit breaker switch 484 is configured to reset the circuit breaker 474 after the circuit breaker 474 interrupts the circuit.

In one embodiment, the GFCI device 476 interrupts the electric circuit in response to an electrical leak in the circuit. The GFCI device 476 can interrupt the electric circuit more quickly than the circuit breaker 474. The GFCI device 476 is configured to detect a difference in the amount of current entering the circuit and the amount of current exiting the circuit, indicating an electrical current leak, or a separate path to ground. In one embodiment, the GFCI device 476 is able to sense a current mismatch as small as 4 or 5 milliamps, and can react as quickly as one-thirtieth of a second to the current mismatch. In one embodiment, the GFCI switch 486 is configured to reset the GFCI device 476 after the GFCI device 476 interrupts the circuit.

In one embodiment, electronic switch 478 disconnects the load from electric power, without disconnecting the rest of the circuit. In one embodiment, the electronic switch 478 disconnects the load after a user initiated a power down phase of the system. During a shutdown state, the system 400 may activate the electronic switch 478 and disconnect the load, continue to generate electricity to charge the power storage device 468 and to use excess hydrogen.

In one embodiment, the DC outlet 480 provides an outlet or plug interface for supplying DC power to DC devices. In one embodiment, the DC power has a standard DC voltage. In one embodiment, the standard DC voltage is about 9 to 15 Volts DC. In a further embodiment, the DC outlet 480 is a "cigarette lighter" type plug, similar to the DC outlets found in many automobiles.

In one embodiment, the AC inverter 481 converts DC power from the DC to DC converter 476 to AC power. In one embodiment, the AC inverter 481 converts the DC power to AC power having a standard AC voltage. The standard AC voltage may be chosen based on region, or the intended use of the system 400. In one embodiment, the standard AC voltage is about 110 to 120 Volts. In another embodiment, the standard AC voltage is about 220 to 240 Volts. In one embodiment, the AC inverter 481 converts the DC power to AC power having a standard frequency, such as 50 Hz or 60 Hz. The standard frequency may also be selected based on region, or by intended use, such as 16.7 Hz or 400 Hz.

In one embodiment, the AC outlet 482 provides an outlet or plug interface for supplying AC power from the AC inverter 481 to AC devices. In one embodiment, the AC outlet 482 is configured as a standard AC outlet according to a geographical region.

In one embodiment, the display 488 is configured to communicate information to a user. The display 488 may be a liquid crystal display (LCD), a light emitting diode (LED) display, a cathode ray tube (CRT) display, or another display means capable of signaling a user. In one embodiment, the display 488 is configured to communicate error messages to a user. In a further embodiment, the display 488 is configured to communicate the amount of power stored by the power storage device 468 to a user. In another embodiment, the display 488 is configured to communicate the usage status of the hydrogen fuel cartridge 406 to a user.

In one embodiment, the keypad 490 is configured to receive input from a user. In one embodiment, the user is a technician, and the keypad 490 is configured to facilitate system error diagnosis or troubleshooting by the technician. The input may be configured to signal the system 400 to begin a start up or shut down phase, to navigate messages, options, or menus displayed on the display 488, to signal the selection of a menu item by the user, or to communicate error, trouble- shooting, or other information to the system 400. The keypad 490 may comprise one or more keys, numeric keypad, buttons, click-wheels, or the like.

In one embodiment, the controller 492 is configured to control one or more components of the system 400. The controller 492 may be an integrated circuit such as a microprocessor, an application specific integrated circuit (ASIC), a field programmable gate array (FPGA), an embedded controller, or the like and related control circuitry. The controller 492 communicates with the hydrogen pressure sensor 432, the one or more sensors 418, the pump 426, the level detector 429, the air pump 452, the hydrogen pressure sensor 444, the electrical sensors 470, the temperature sensor 464, the display 488, the keypad 490, and/or other components.

In one embodiment, the controller 492 uses a control bus 496 to communicate with the components. The control bus may be one or more wires, or another communications medium providing control commands and data in series or parallel. The controller 492 may communicate on the bus using digital or analog communications. The controller 492 may monitor and optimize system efficiency and system safety, as discussed above. In one embodiment, the control bus 496 may comprise a serial peripheral interface (SPI) bus.

In one embodiment, the controller 492 balances the supply of electric power delivered to the electric load between the electric power generated by the fuel cell stack 458 and the electric power stored by the electric power storage devices 468. The controller 492 may balance the supply of electric power based on the communication signals that the controller 492 receives on the control bus 496, as described above, the electric power demands of an electric load, and/or one or more mathematical or statistical curves.

In one embodiment, the controller 492 actively monitors the electric state of the power storage devices 468, the fuel cell stack 458, and the electric power demands of the electric load. The controller 492 may increase the electric power output of the power storage devices 468 in response to an electric power demand by the electric load that is higher than the electric power output of the fuel cell stack 458, and may charge the power storage devices 468 with excess power from the from the fuel cell stack 458 in response to an electric power demand by the electric load that is lower than the electric power output of the fuel cell stack. As described above with regard to the power storage devices 468, this increases the efficiency of the system 400, decreases wasted electric power, and provides a buffer for the fuel cell stack 458 such that the fuel cell stack 458 does not constantly vary its output based on the demands of the electric load.

The controller 492 may balance the supply of electric power actively or passively. For example, the fuel cell stack 458 and the power storage devices 468 may be electrically coupled in a parallel configuration, such that the controller 492 passively balances the electric power delivered to the electric load between them. The controller 492 may balance the electric power by draining the power storage devices 468 under high loads and during hydrogen production delays, and charging the power storage devices 468 under low loads.

In another embodiment, the controller 492 may use device switching to balance the electric power delivered to the electric load based on the communication signals that the controller 492 receives on the control bus 496. The controller 492 may balance the electric power by sending control signals to one or more switches coupled electrically to the subsystems described above, such as the cartridge cooling system 412, the one or more liquid pumps 426, the one or more air pumps 452, the fuel cell cooling system 462, and the like. For example, the controller 492 may adjust the output of the air pumps 452 to increase or decrease electrical output of the fuel cell stack 458, in response to an increased electric power demands, or safety reasons such as a temperature reading from the fuel cell temperature sensor 464. In one embodiment, the control signals are pulse width modulated (PWM) signals, and the switches are PWM controlled metal oxide semiconductor field effect transistors (MOSFETs). In addition to balancing the electric power output between the fuel cell stack 458 and the one or more power storage devices 468, the controller 492 may increase or decrease hydrogen output by the hydrogen generation system 401 by calculating a liquid reactant injection rate based on the power demands of the electric load or based on a hydrogen pressure reading by the hydrogen pressure sensor 432, as described above with regard to the one or more liquid pumps 426.

In one embodiment, the controller 492 may store one or more system status messages, performance data, or statistics in a log that may be accessed by a user using the display 490 or the computer communication interface 494. In one embodiment, the controller 492 and other circuitry are positioned to prevent electrical shorts and fire due to water within the outer housing 404. For example, in one embodiment, the controller 492 and other circuitry are position towards the top of the system 400.

In one embodiment, the computer communication interface 494 is configured to interface the controller 492 with a computer. The computer communication interface 494 may comprise one or more ports, terminals, adapters, sockets, or plugs, such as a serial port, an Ethernet port, a universal serial bus (USB) port, or other communication port. In one embodiment, a computer may use the computer communication interface 494 to access system logs, performance data, system status, to change system settings, or to program the controller 492.

In one embodiment, the outer housing 404 is configured to enclose and protect the system 400. The outer housing 404 comprises a durable material such as metal, plastic, and the like. In one embodiment, the outer housing 404 is a lightweight material to increase the portability of the system 400. In a further embodiment, the outer housing 404 has a hole or a window to facilitate monitoring of the liquid reactant level in the liquid reservoir 428 by the user. In a further embodiment, the housing 404 is further configured to provide electronic frequency shielding to components of the electric and control system 403.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to generate a gas, the apparatus comprising:
    one or more liquid permeable pouches, each of the pouches defining a cavity comprising a solid anhydrous reactant;
    a reaction chamber comprising a heat and pressure resistant material, the reaction chamber configured to receive the one or more pouches and a liquid reactant;
    one or more reactant inlets configured to join the liquid reactant and the one or more pouches such that the liquid reactant contacts at least a portion of the one or more pouches; and
    a gas outlet configured to release gas produced by a reaction comprising the solid anhydrous reactant and the liquid reactant.

2. The apparatus of claim 1, wherein the one or more reactant inlets comprise one or more liquid sources configured to inject the liquid reactant into the reaction chamber such that the liquid reactant contacts at least a portion of the one or more pouches, the one or more liquid sources injecting the liquid reactant at an injection rate.

3. The apparatus of claim 2, wherein the one or more reactant inlets transfer the one or more pouches into the reaction chamber successively at a feed rate corresponding to the injection rate.

4. The apparatus of claim 1, wherein the one or more liquid permeable pouches comprise a heat diffusion layer disposed adjacent to the solid anhydrous reactant such that the heat diffusion layer transfers heat from the solid anhydrous reactant.

5. The apparatus of claim 1, wherein the liquid reactant comprises a liquid selected from the group consisting of water, alcohols, and peroxides.

6. The apparatus of claim 1, wherein the produced gas comprises hydrogen and the solid anhydrous reactant comprises a chemical hydride and an anhydrous activating agent.

7. The apparatus of claim 1, wherein the produced gas comprises oxygen and the solid anhydrous reactant is selected from the group consisting of chlorates, perchlorates, superoxides, and ozonides.

8. The apparatus of claim 1, wherein the produced gas is selected from the group comprising ammonia, borazine, nitrogen, and hydrocarbons.

9. An apparatus to generate a gas, the apparatus comprising:
    one or more liquid permeable pouches, each of the pouches defining a cavity comprising a solid anhydrous reactant;
    a reaction chamber comprising a heat and pressure resistant material, the reaction chamber configured to receive the one or more pouches and a liquid reactant;
    a pouch feeder configured to transfer the one or more pouches into the reaction chamber successively at a feed rate;
    one or more liquid sources configured to inject the liquid reactant into the reaction chamber such that the liquid reactant contacts at least a portion of the one or more pouches, the one or more liquid sources injecting the liquid reactant at an injection rate corresponding to the feed rate; and
    a gas outlet configured to release a gas produced by a reaction comprising the solid anhydrous reactant and the liquid reactant.

10. The apparatus of claim 9, wherein the transfer of the one or more pouches by the pouch feeder and the injection of the liquid reactant by the one or more liquid sources are both initiated by a single actuator.

11. The apparatus of claim 9, wherein the transfer of the one or more pouches by the pouch feeder and the injection of the liquid reactant by the one or more liquid sources are independently initiated.

12. The apparatus of claim 9, wherein the pouch feeder comprises one or more rollers, wherein at least one of the rollers is configured to press excess liquid from the one or more pouches in response to a substantial completion of the reaction in at least a portion of the one or more pouches.

13. The apparatus of claim 9, wherein the one or more pouches further comprise a protective covering and further wherein the pouch feeder is configured to puncture the protective covering.

14. The apparatus of claim 13, wherein the one or more liquid sources are configured to inject the liquid reactant into the protective covering through the pouch feeder and the protective covering comprises a water impermeable high temperature thin film plastic.

15. The apparatus of claim 9, wherein the one or more pouches are foldably coupled to each other in series.

16. The apparatus of claim 9, wherein the one or more pouches are independent of each other and the pouch feeder is configured to load each of the pouches separately.

17. The apparatus of claim 9, wherein the one or more pouches further comprise one or more alignment structures and the pouch feeder is configured to receive the one or more alignment structures.

18. The apparatus of claim 9, wherein the reaction chamber is removable.

19. A system to generate hydrogen, the system comprising:
a pouch source configured to store an unused portion of one or more liquid permeable pouches, each of the pouches defining a cavity comprising a solid anhydrous chemical hydride;
a reaction chamber comprising a heat and pressure resistant material, the reaction chamber configured to receive the one or more pouches and a liquid reactant;
a pouch feeder configured to transfer the one or more pouches from the pouch source into the reaction chamber successively at a feed rate;
one or more liquid sources configured to inject the liquid reactant into the reaction chamber such that the liquid reactant contacts at least a portion of the one or more pouches, the one or more liquid sources injecting the liquid reactant at an injection rate corresponding to the feed rate;
a hydrogen outlet configured to release hydrogen gas produced by a reaction comprising the solid anhydrous chemical hydride and the liquid reactant; and
a used pouch storage configured to receive a used portion of the one or more pouches from the reaction chamber.

20. The system of claim 19, further comprising a second reaction chamber configured to receive a portion of the one or more pouches from the pouch feeder and a portion of the liquid from the one or more liquid sources.

21. The system of claim 19, wherein the pouch source and the used pouch storage occupy a single chamber.

22. The system of claim 19, further comprising a cooling system disposed in substantially direct contact with the reaction chamber, the cooling system comprising a heat-sink and a fan.

23. The system of claim 19, further comprising a hydrogen filtration module configured to remove contaminants from the hydrogen gas, to remove liquids from the hydrogen gas, and to send the liquids to the one or more liquid sources, wherein the hydrogen filtration module is removable and replaceable.

* * * * *